(12) United States Patent
Choi et al.

(10) Patent No.: US 11,438,082 B2
(45) Date of Patent: Sep. 6, 2022

(54) BROADCAST RECEIVING METHOD AND APPARATUS OF ELECTRONIC DEVICE

(71) Applicant: Samsung Electronics Co., Ltd., Gyeonggi-do (KR)

(72) Inventors: Sehwan Choi, Gyeonggi-do (KR); Duhyun Kim, Gyeonggi-do (KR); Woosup Lee, Gyeonggi-do (KR); Jungsik Park, Gyeonggi-do (KR); Youngsoo Chun, Gyeonggi-do (KR); Kwanhoe Ku, Gyeonggi-do (KR); Soyoung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/963,548

(22) PCT Filed: Jan. 23, 2019

(86) PCT No.: PCT/KR2019/000938
§ 371 (c)(1),
(2) Date: Jul. 21, 2020

(87) PCT Pub. No.: WO2019/147005
PCT Pub. Date: Aug. 1, 2019

(65) Prior Publication Data
US 2021/0050924 A1    Feb. 18, 2021

(30) Foreign Application Priority Data
Jan. 23, 2018    (KR) .................... 10-2018-0008291

(51) Int. Cl.
*H04B 1/18*    (2006.01)
*H04H 40/18*    (2008.01)
(Continued)

(52) U.S. Cl.
CPC ............ *H04H 40/45* (2013.01); *H01R 24/60* (2013.01); *H04B 1/06* (2013.01); *H01R 2107/00* (2013.01)

(58) Field of Classification Search
CPC ........ H04H 40/18; H04H 40/45; H04H 40/40; H04B 1/06; H04B 1/16; H04B 1/18;
(Continued)

(56) References Cited

U.S. PATENT DOCUMENTS 5,898,908 A  *  4/1999  Griffin ................. H04B 1/3877
455/127.2
8,412,291 B2 *  4/2013  Harrison ................ H01Q 21/28
455/575.7
(Continued)

FOREIGN PATENT DOCUMENTS

KR    10-0783406 B1    12/2007
KR    10-0783406 B1    12/2007
(Continued)

OTHER PUBLICATIONS

Notice of Preliminary Rejection dated Mar. 30, 2022.

*Primary Examiner* — Blane J Jackson
(74) *Attorney, Agent, or Firm* — Cha & Reiter, LLC

(57) ABSTRACT

An electronic device of various embodiments can include a broadcast receiving module, a connector including a first pin and a second pin, and a processor, wherein the processor can be configured to: identify, through the first pin, the type of external electronic device connected through the connector; drive the broadcast receiving module in a state in which an external antenna included in an external electronic device and the broadcast receiving module are electrically connected through the first pin when the external electronic device corresponds to a designated electronic device type; receive a broadcast signal from the external antenna by using the broadcast receiving module; and output, through (Continued)

the second pin, an audio signal generated on the basis of at least a part of the broadcast signal to a designated device. Other embodiments are also possible.

9 Claims, 19 Drawing Sheets

(51) Int. Cl.
    *H01Q 1/22*     (2006.01)
    *H04H 40/45*     (2008.01)
    *H01R 24/60*     (2011.01)
    *H04B 1/06*     (2006.01)
    *H01R 107/00*     (2006.01)

(58) Field of Classification Search
    CPC ........ H01R 24/60; H01R 24/66; H01R 24/68; H01Q 1/22; H01Q 1/24
    See application file for complete search history.

(56) References Cited

U.S. PATENT DOCUMENTS

| | | | |
|---|---|---|---|
| 8,818,455 B2* | 8/2014 | Harrison | H01Q 1/242 455/557 |
| 9,730,268 B2* | 8/2017 | Bolton | H04W 8/005 |
| 10,418,747 B2* | 9/2019 | Zhao | H01R 13/6581 |
| 2004/0116005 A1 | 6/2004 | Choi | |
| 2006/0234781 A1* | 10/2006 | Bosch | H04M 1/6083 455/569.2 |
| 2007/0085748 A1* | 4/2007 | Caesar | H01Q 1/2275 343/702 |
| 2008/0085734 A1* | 4/2008 | Kim | H04B 1/18 455/553.1 |
| 2009/0109117 A1* | 4/2009 | Johansson | H04B 1/0458 343/876 |
| 2017/0127203 A1 | 5/2017 | Ryu | |
| 2017/0222459 A1 | 8/2017 | Kang | |

FOREIGN PATENT DOCUMENTS

| | | |
|---|---|---|
| KR | 10-2010-0084417 A | 7/2010 |
| KR | 10-2012-0099900 A | 9/2012 |
| KR | 10-2017-0049958 A | 5/2017 |
| KR | 10-2017-0092352 A | 8/2017 |

\* cited by examiner

| PIN No. | Signal Name | Note |
|---|---|---|
| 1 | GND | Ground |
| 2 | TX+ | Super speed TX positive |
| 3 | TX- | Super speed TX negative |
| 4 | V<sub>BUS</sub> | USB cable charging power |
| 5 | CC | Identification terminal |
| 6 | D+ | + line of the differential bi-directional USB signal |
| 7 | D- | - line of the differential bi-directional USB signal |
| 8 | SBU | Side Band Use : additional purpose pin (ex: Audio signal, display signal, etc.) |
| 9 | V<sub>BUS</sub> | USB cable charging power |
| 10 | RX- | Super speed RX negative |
| 11 | RX+ | Super speed TX positive |
| 12 | GND | Ground |

FIG.5B

BROADCAST RECEIVING METHOD AND APPARATUS OF ELECTRONIC DEVICE

CROSS-REFERENCE TO RELATED APPLICATION(S)

This application is a National Phase Entry of PCT International Application No. PCT/KR2019/000938, which was filed on Jan. 23, 2019, and claims priority to Korean Patent Application No. 10-2018-0008291, which was filed on Jan. 23, 2018, the contents of which are incorporated herein by reference.

TECHNICAL FIELD

The disclosure relates to an apparatus and a method for receiving a broadcast signal using a Type-C connector.

BACKGROUND ART

In recent years, a variety of electronic devices are being provided for users, and users can access different types of content while carrying various electronic devices. An electronic device may be connected to various external devices through an interface for connection with an external device (e.g., a USB connector), and may be connected to an external device to provide extended functions. An electronic device may include different types of connectors according to various interfaces.

Some connectors, for example, a 3.5 phi analog audio connector, among different types of connectors can support connection between an electronic device and an antenna (e.g., a DMB antenna or FM antenna) capable of receiving wireless communication data. Some other connectors, for example, a universal serial bus (USB) Type-C connector, do not support connection between an electronic device and an antenna.

In the case of a connector that does not support connection between an electronic device and an antenna, it is possible to support a specified function for an electronic device through the connector, but it may be impossible to support a wireless communication data reception function using an antenna.

DISCLOSURE OF INVENTION

Technical Problem

The USB Type-C standard specifies methods for transmitting a sound source through a digital line and reproducing a sound source by switching a digital line to an analog line. However, the standard does not specify configuration of an earphone antenna. Electronic devices are legally required to have an FM reception function for receiving a disaster broadcast. Therefore, a device and a method for receiving an FM signal using an earphone antenna device with a USB Type-C connector are required.

When a method of commonly using a ground (GND) is used, in a Type-C connector, like a 3.5 phi connector, a different accessory device using a high-speed Type-C data line may have a signal disrupted due to the impact of an inductor in the GND, interference may occur between a digital line of an FM antenna and an FM analog signal of the GND, and a high-speed USB 3.0 device may undergo deterioration in analog characteristics due to lack of a DC GND.

An electronic device according to various embodiments may provide a device and a method for receiving a broadcast signal using a connection to an external antenna configured by employing a sideband user (SBU) line of a Type-C connector and separating a GND.

An electronic device according to various embodiments may provide a device and a method for receiving a broadcast signal by connecting to an external antenna with a configuration in which a first ground pin of a Type-C connector is connected to a GND through a bead or an inductor and a second ground pin is directly connected to the GND.

An external antenna device according to various embodiments may provide a device and a method for receiving a broadcast signal by connecting to an electronic device with a configuration in which a first ground pin of a Type-C connector is connected to a GND through a bead or an inductor and a second ground pin is directly connected to the GND.

Solution to Problem

An electronic device according to various embodiments may include a broadcast reception module, a connector configured to include a first pin and a second pin, and a processor. The processor may be configured to: identify, through the first pin, a type of an external electronic device connected through the connector; drive the broadcast reception module with an external antenna included in the external electronic device and the broadcast reception module electrically connected through the first pin when the type of the external electronic device corresponds to a specified electronic device type; receive a broadcast signal using the broadcast reception module from the external antenna; and output an audio signal generated based at least partly on the broadcast signal to a specified device through the second pin.

An electronic device according to various embodiments may include: at least one speaker configured to emit a sound; an antenna; and a connection interface configured to be electrically connected to the antenna and to include a plurality of pins for connecting to an external electronic device. The connection interface may: be connected to the antenna using a specified first pin among the plurality of pins, at least a portion of the antenna being connected to at least one ground part; transmit a signal obtained via the antenna to the external electronic device through the first pin; and obtain sound information corresponding to the signal from the external electronic device using a specified second pin among the plurality of pins and emit a sound corresponding to the obtained sound information to the outside through the speaker.

An electronic device according to various embodiments may include a broadcast reception module, a connector configured to include a first ground pin, a second ground pin, and a data pin, a bead or an inductor configured to be connected to the first ground pin and the ground and to block a broadcast signal of a ground line from flowing to the ground, and a processor. The processor may be configured to: identify a type of an external electronic device through the connector; drive the broadcast reception module with an external antenna included in the external electronic device and the broadcast reception module electrically connected through the first ground pin when the type of the external electronic device corresponds to a specified electronic device type; receive a broadcast signal using the broadcast reception module from the external antenna; and output an audio signal generated based at least partly on the received broadcast signal to a specified device through the data pin.

An electronic device according to various embodiments may include: at least one speaker configured to emit a sound; an antenna; and a connection interface configured to be electrically connected to the antenna and to include a plurality of pins for connecting to an external electronic device. The connection interface may: be connected to the antenna using a first ground pin connected to a ground part through a bead or inductor among the plurality of pins; transmit a signal obtained via the antenna to the external electronic device through the first ground pin; and obtain sound information corresponding to the signal from the external electronic device using a data pin and emit a sound corresponding to the obtained sound information to the outside through the speaker.

A broadcast signal reception method of an electronic device according to various embodiments may include: identifying, through a first pin, a type of an external electronic device connected through a connector including the first pin and a second pin; driving a broadcast reception module with an external antenna included in the external electronic device and the broadcast reception module electrically connected through the first pin when the type of the external electronic device corresponds to a specified electronic device type; receiving a broadcast signal using the broadcast reception module from the external antenna; and outputting an audio signal generated based at least partly on the broadcast signal to a specified device through the second pin.

Advantageous Effects of Invention

In a Type-C connector of an electronic device, an SBU line is used as an AUX line of a display port (DP). The AUX line may be used to transmit an audio signal at a low-frequency of 1 Mhz or lower. Therefore, the AUX line is distant from a frequency domain of FM and DMB broadcast signals, thus facilitating filtering, and may be less sensitive than a USB digital line. In addition, since the GND of the electronic device does not change, characteristics of the electronic device and an external device connected to the electronic device may not be affected.

According to a method in which an electronic device receives a broadcast signal by connecting to an earphone antenna device through a Type-C connector according to various embodiments, it is possible to minimize the impact of USB characteristics by separating a GND line of the electronic device, and a Type-C earphone antenna device can also receive a broadcast signal while maintaining USB Type-C performance and usability.

BRIEF DESCRIPTION OF DRAWINGS

FIG. 5A and FIG. 5B illustrate pins of a connector according to various embodiments;

BEST MODE FOR CARRYING OUT THE INVENTION

Hereinafter, various embodiments of the disclosure will be described in detail with reference to the accompanying drawings. When detailed descriptions about related known functions or configurations are determined to make the gist of the disclosure unclear in describing embodiments of the disclosure, the detailed descriptions will be omitted herein. Furthermore, terms used below are defined in view of functions in the disclosure and may thus be changed depending on the user, the intent of an operator, or the custom. Accordingly, the terms should be defined based on the following overall description of this specification.

Figure 1:
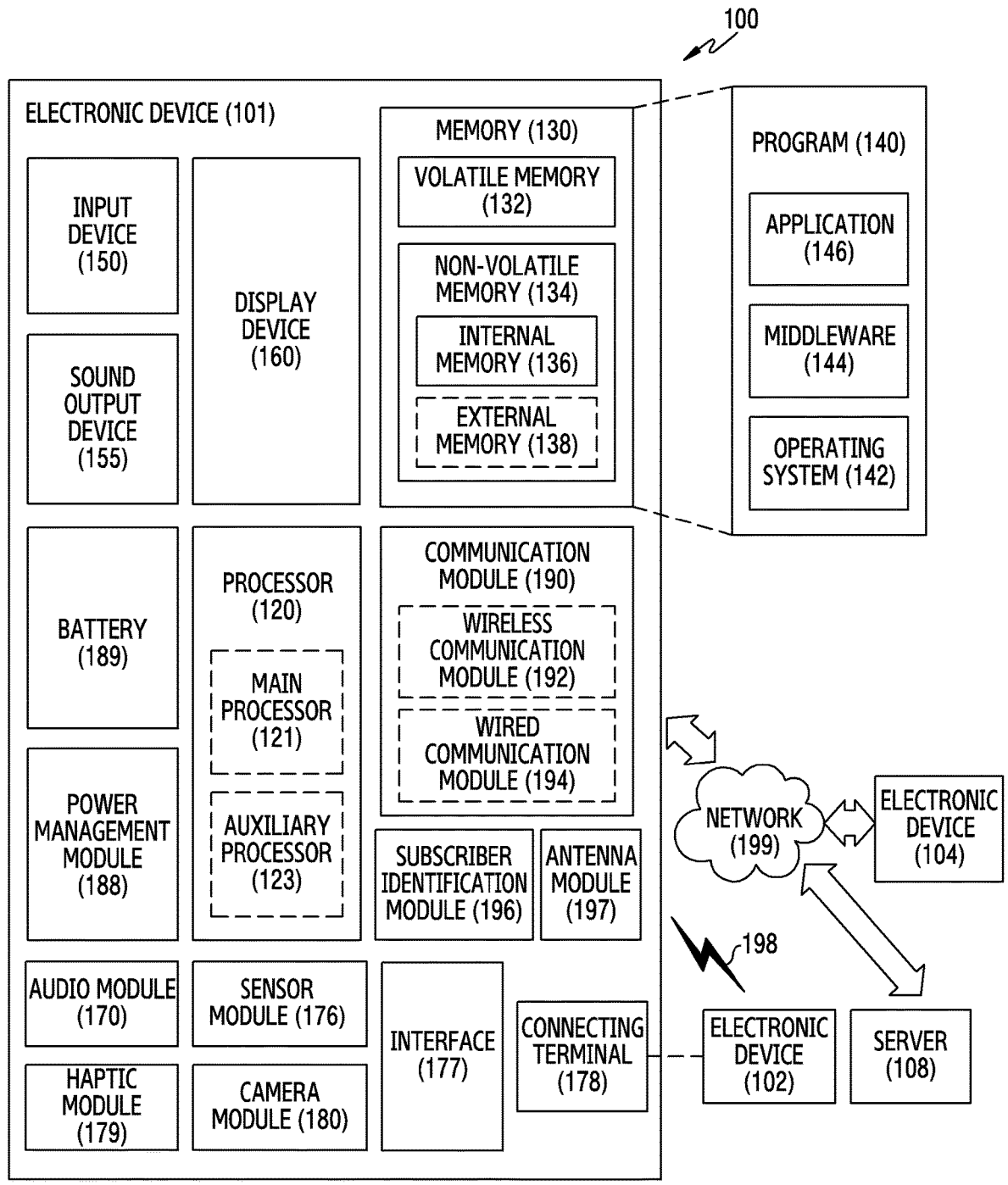
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
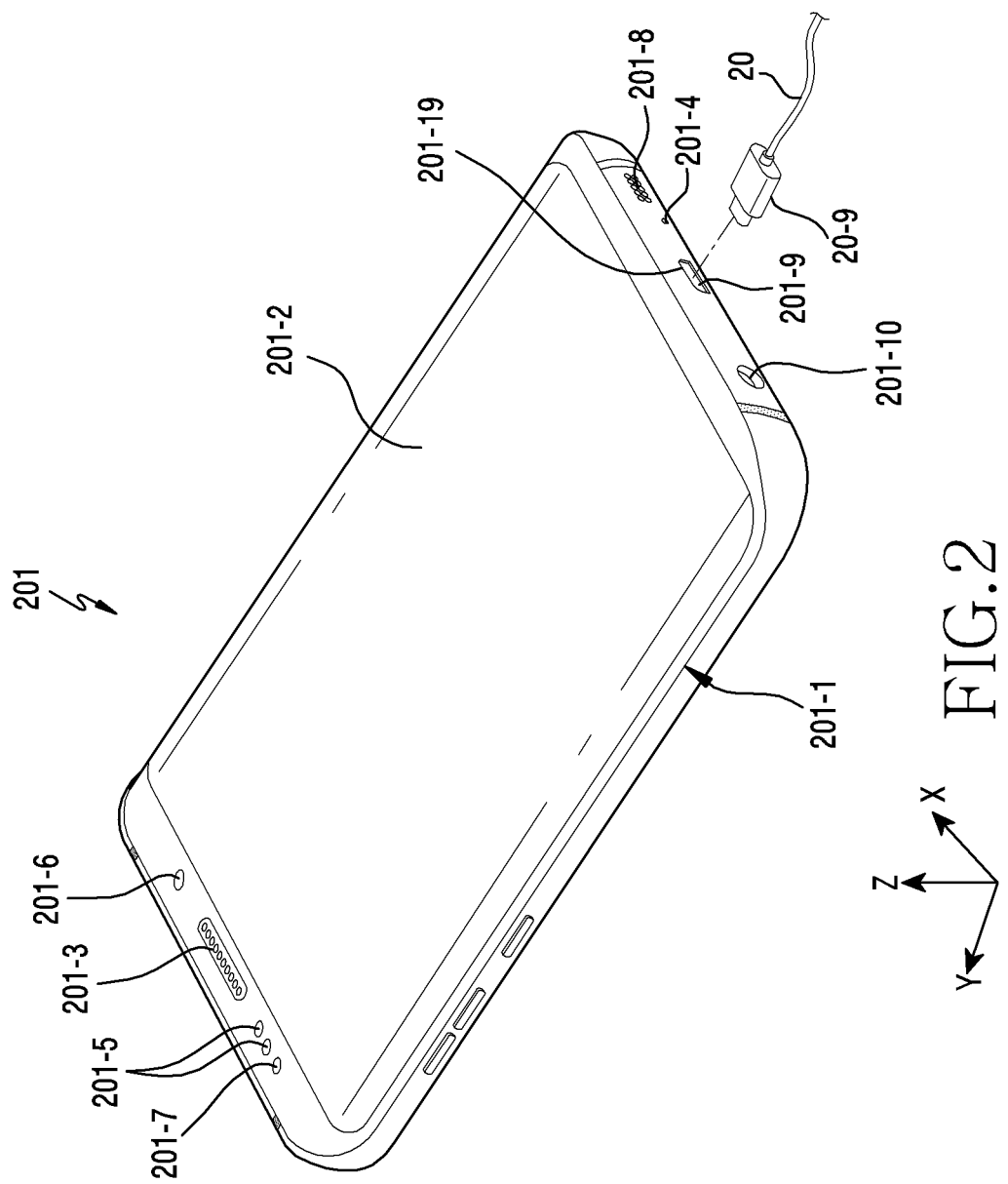
FIG. 2 is a perspective view illustrating an electronic device according to various embodiments.

FIG. 2 is a perspective view illustrating an electronic device according to various embodiments Referring to FIG. 2, in a three-dimensional Cartesian coordinate system, X may denote a width direction of the electronic device 201 (e.g., the electronic device 101 of FIG. 1), Y may denote a length direction of the electronic device 201, and Z may denote a thickness direction of the electronic device 201.

The electronic device 201 may include a housing 201-1. The housing 201-1 may be formed of a conductive member and/or nonconductive member. The electronic device 201 may include a touch screen display 201-2 (e.g., the display device 160 of FIG. 1) disposed to be exposed through at least a portion of the housing 201-1. The electronic device 201 may include a receiver 201-3 (e.g., the sound output device 155 of FIG. 1) that is disposed in the housing 201-1 and outputs a counterpart's voice. The electronic device 201 may include a microphone device 201-4 (e.g., the input device 150 of FIG. 1) that is disposed in the housing 201-1 and transmits a user's voice to a counterpart. The electronic device 201 may include components that are disposed to be exposed on the touch screen display 201-2 or are disposed not to be exposed while performing a function through a window and perform various functions of the electronic device 201. The components may include at least one of at least one sensor module 201-5 (e.g., the sensor module 176 of FIG. 1) and camera devices 201-6 (e.g., the camera module 180 of FIG. 1).

According to various embodiments, the electronic device 201 may include a speaker device 201-8 (e.g., the sound output device 155 of FIG. 1) disposed at one side of the microphone device 201-4. The electronic device 201 may include a connector 201-9 (e.g., the connection terminal 178 of FIG. 1) disposed at another side of the microphone device 201-4 to enable a connection with an external device. The connector 201-9 may be a connector in a socket form. For example, the connector 201-9 may be a USB Type-C connector (receptacle connector).

According to various embodiments, an opening 201-19 may be formed in at least a portion of the housing 201-1 to expose the connector 201-9, and the connector 201-9 may be disposed in the opening 201-19. According to various embodiments, an external connector 20-9 in a header form may be coupled to the connector 201-9 in a forward or reverse direction. The external connector 20-9 may be a plug connector. The external connector 20-9 may be connected with an external device 20, and when the connector 201-9 and the external connector 20-9 are coupled, the electronic device 201 and the external device 20 (e.g., the electronic device 102 of FIG. 1) may be connected. The external device 20 may include various external devices that can be connected to the electronic device 201. For example, the external device 20 may be a device including an antenna for receiving a broadcast signal.

The connector 201-9 may include a housing having an opening formed in at least a portion of the outer surface thereof so as to be coupled with the external connector 20-9 in the forward or reverse direction. The connector 201-9 may include a substrate inside the opening, and the substrate may include a first surface on which a plurality of first pins corresponding to the forward direction is disposed and a second surface on which a plurality of second pins corresponding to the reverse direction is disposed.

The connector 201-9 may further include first and second latch pins that enable electrical or physical connection of the external connector 20-9. At least a portion of the first and second latch pins may include a binding groove to which the external connector 20-9 can be bound. For example, the first latch pin may correspond to the forward direction, the second latch pin may correspond to the reverse direction, and at least one of the first and second latch pins may be selectively connected to wireless communication data.

The external connector 20-9 may include an external substrate including at least one pin that can be coupled with some of the plurality of pins of the substrate of the connector 201-9. For example, the external substrate includes at least one pin that can be coupled with at least some of the plurality of first pins of the substrate of the connector 201-9 and the plurality of second pins of the substrate of the connector 201-9.

Figure 3:
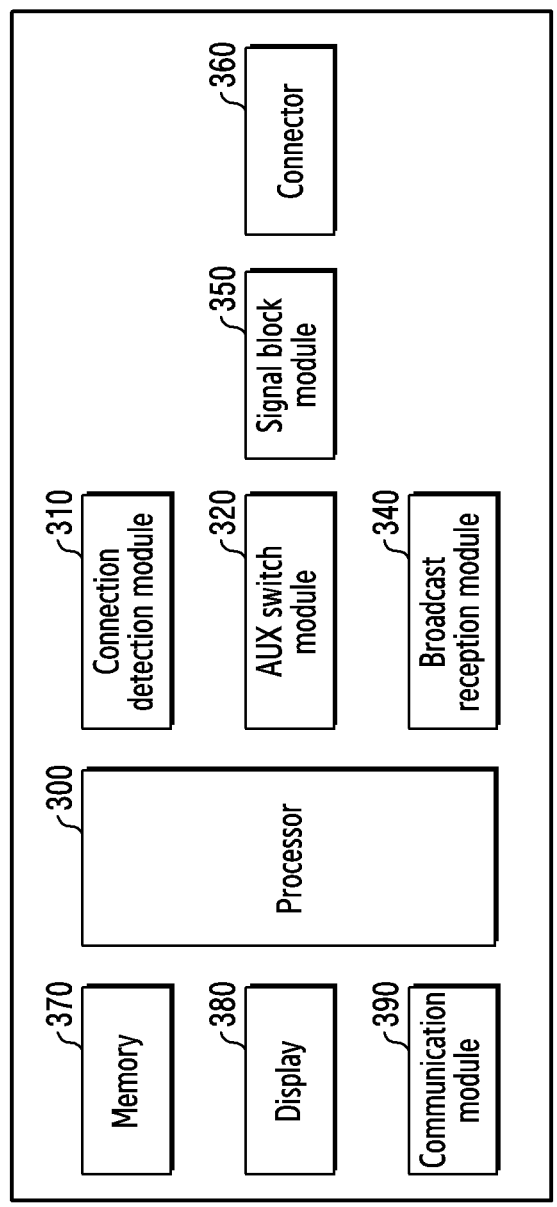
FIG. 3 illustrates an electronic device having a connector enabling connection of an external antenna according to various embodiments.

FIG. 3 illustrates an electronic device having a connector enabling connection of an external antenna according to various embodiments.

Referring to FIG. 3, the electronic device (e.g., the electronic device 101 of FIG. 1 or the electronic device 201 of FIG. 2) may include a processor 300, a memory 370, a connection detection module 310, an AUX switch module 320, a broadcast reception module 340, a signal block module 350, a connector 360, a memory 370, a display 380, and a communication module 390.

The processor 300 (e.g., the processor 120 of FIG. 1) may control the overall operation of the electronic device. The processor 300 may include one or more of a central processing unit, an application processor, or a communication processor (CP). The processor 300 may perform an operation relating to control and/or communication of at least one other component of the electronic device or may perform data processing.

The connector 360 (e.g., the connection terminal 178 of FIG. 1 or the connector 201-9 of FIG. 2) may be electrically or physically coupled with a connector (e.g., the connector 20-9 of FIG. 2) of an external device to connect the electronic device and the external device. According to various embodiments, the connector 360 may include a USB connector including a plurality of pins. According to one embodiment, the connector 360 may be a USB Type-C connector. According to various embodiments, the connector 360 may include a first pin and a second pin. The first pin may be an SBU pin, and the second pin may be a D+ pin and a D− pin. The connector 360 may include a first ground pin and a second ground pin.

The signal block module 350 may interface a signal between the connector 360 and the connection detection module 310, the AUX switch module 320, and the broadcast reception module 340. For example, the signal block module 350 may perform a function of blocking a signal received from the connector 360 from being applied to a different component according to an operating mode.

The connection detection module 310 may detect connection of the connector of the external device to the connector 360. The connection detection module 310 may include a universal serial bus (USB) interface, and may include a voltage detection circuit (e.g., an integrated chip (IC)) to process the USB interface. The connection detection module 310 may detect at least one pin coupled with a pin of the connector of the external device among the plurality of pins of the connector 360 or may detect a voltage applied to the at least one pin, and may perform switching so that each of the at least one pin coupled with the pin of the connector among the plurality of pins is connected to a relevant circuit. According to an embodiment, the connection detection module 310 may recognize the connected external device, based on the ID of the external device connected to the connector 360. For example, the connection detection module 310 may include at least one of a micro-USB interface controller (MUIC), a cable and connector integrated chip (CCIC), or a power delivery integrated chip (PDIC). For example, the connection detection module 310 may be an interface power management integrated circuit (IF PMIC) (CCIC) to detect water infiltrating into a Type-C connector.

The AUX switch module 320 may perform an AUX switching operation when a display port (DP) connector is reversibly inserted.

The broadcast reception module 340 may process a broadcast signal received through the connector 360. For example, the broadcast reception module 340 may be an FM reception module. When an external antenna device in which an external device includes an FM antenna is connected to the connector 360, the processor 300 may recognize the connection of the external antenna device and may perform control so that a broadcast signal received through the connector 360 is applied to the broadcast reception module 340.

The memory 370 (e.g., the memory 130) may include a volatile and/or a nonvolatile memory. The memory 370 may store, for example, a command or data associated with at least one different component of the electronic device 201. According to one embodiment, the memory 370 may store software and/or a program. According to one embodiment, the memory 370 may store instructions to perform operations executed by the processor 300.

The display 380 (e.g., the display device 160) may visually provide information associated with recognition and identification of connection with an external device to a user of the electronic device, may display information associated with performance of a specified function when the specified function is performed by connection with the external device, and may display information about received broadcast data when the broadcast data is received by connection with the external device.

The communication module 390 (e.g., the communication module 190 of FIG. 1) may include a wireless communication circuit capable of receiving a wireless communication data signal.

According to various embodiments, the processor 300 may identify, through the first pin, the type of an external electronic device connected through the connector 360. The processor 300 may identify the type of the external device through the first pin (e.g., the SBU pin). When the external electronic device corresponds to a specified electronic device type, the processor 300 may drive the broadcast reception module 340 in a state where an external antenna included in the external electronic device and the broadcast reception module 340 are electrically connected through the first pin. The processor 300 may receive a broadcast signal from the external antenna using the broadcast reception module 340. The processor 300 may output an audio signal generated based at least partly on the received broadcast signal to a specified device through the second pin (e.g., the D+ pin and D− pin). The processor 300 may include a codec and may transmit a received broadcast signal processed by the codec to a specified device through the second pin of the connector 360. The specified device may be an internal speaker, an external Bluetooth module, an external electronic device including a speaker, or the like. For example, the specified device may be an earphone device.

The connector 360 according to various embodiments may include the first ground pin, the second ground pin, and a data pin. The electronic device may include a bead or inductor that is connected to the first ground pin and a ground part to block a broadcast signal of a ground line from flowing to the ground. The processor 300 may analyze the product ID (PID) of an external electronic device received through the connector 360, thereby determining the type of the external device. For example, the processor 300 may identify the type of an external device connected through a CC pin. When the external electronic device corresponds to a specified electronic device type, the processor 300 may drive the broadcast reception module 340 in a state where an external antenna included in the external electronic device and the broadcast reception module 340 are electrically connected through the first ground pin. The processor 300 may receive a broadcast signal from the external antenna using the broadcast reception module 340. The processor 300 may output an audio signal generated based at least partly on the received broadcast signal to a specified device through the second pin (e.g., the D+ pin and D− pin).

Figure 4:
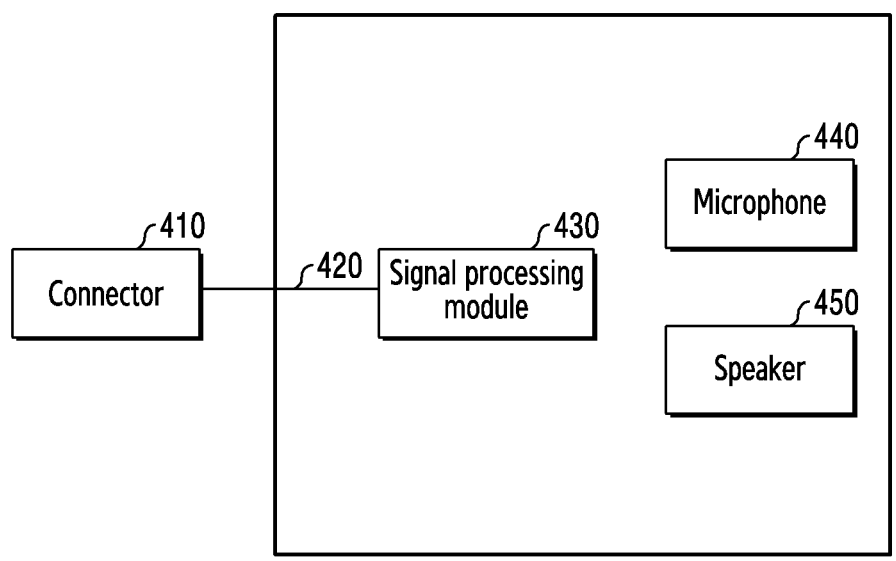
FIG. 4 illustrates the configuration of an earphone antenna device that can be connected to an electronic device through a Type-C connector according to various embodiments.

FIG. 4 illustrates the configuration of an electronic device that can be connected to an external electronic device through a connection interface of a Type-C connector according to various embodiments. For example, the electronic device having the configuration illustrated in FIG. 4 may be an antenna device including a Type-C connector (connection interface).

Referring to FIG. 4, an external antenna device may include a connector 410, an antenna 420, a signal processing module 430, a microphone 440, and a speaker 450.

The connector 410 (e.g., the connector 20-9 of FIG. 2) may be electrically or physically coupled with a connector (e.g., the connector 201-9 of FIG. 2 or the connector 360 of FIG. 4) of an electronic device to enable connection to the electronic device. According to various embodiments, the connector 410 may be a USB Type-C connector in a plug form including a plurality of pins.

The antenna 420 may be a wire connecting the connector 410 and the signal processing module 430 and may function as a broadcast reception antenna function. The antenna 420 may receive an FM broadcast or DMB broadcast signal.

The signal processing module 430 may convert a broadcast signal, transmitted from the electronic device through the connector 410, to be reproduced in the speaker 450. For example, the signal processing module 430 may include a digital-to-analog converter (DAC) to convert digital audio data received through the connector 410 into an analog audio signal and to apply the converted analog audio signal to the speaker 450. For example, the electronic device connected to the connector 410 may transmit encoded broadcast audio data. The signal processing module 430 may include a codec to decode the encoded data received through the connector 410, to convert the decoded audio data into an analog audio signal, and to apply the analog audio signal to the speaker 450. The microphone 440 may receive a user's voice, and the speaker 450 may reproduce an audio signal processed by the signal processing module 430.

According to various embodiments, an external device (e.g., the electronic device 102 of FIG. 1 or the external device 20 of FIG. 2) may be an external antenna device capable of receiving a broadcast signal. A connector 410 of the external antenna device and the connector 360 of the electronic device may be USB Type-C connectors. When the connector 410 is connected to the connector 360, the processor 300 may recognize connection of the external antenna device through the connection detection module 310 when the connector 410 is connected to the connector 360. The processor 300 may recognize connection of the external device and may identify the external antenna device through at least one pin, for example, a configuration channel (CC) pin, among a plurality of signal pins included in the connector 360.

An electronic device according to various embodiments may include at least one speaker 450 to emit a sound, an antenna 420, and a connection interface that is electrically connected to the antenna and includes a plurality of pins for connecting to an external electronic device. The connection interface may be a plug-type connector 410 including a first pin and a second pin. The first pin may be an SBU pin, and the second pin may be D+ and D− pins. The connection interface may be connected with the antenna 420 using the specified first pin among the plurality of pins, and a portion of the antenna 420 may be connected to at least one ground part. The connection interface may transmit a signal obtained via the antenna 420 to an external electronic device through the first pin. The external electronic device may be the electronic device illustrated in FIG. 3. The connection interface may obtain sound information corresponding to a signal from the external electronic device using the specified second pin among the plurality of pins and may emit a sound corresponding to the obtained sound information to the outside through the speaker 450. The electronic device illustrated in FIG. 4 may include a signal processing module 430 and may process and transmit an audio signal from the external electronic device, received through the connection interface, to the speaker 450.

An electronic device according to various embodiments may include at least one speaker 450 to emit a sound, an antenna 420, and a connection interface that is electrically connected to the antenna and includes a plurality of pins for connecting to an external electronic device. The connection interface may be a connector 410 and may include a first ground pin, a second ground pin, and data pins. The connection interface may be connected with the antenna 420 using the first ground pin, connected to a ground part through a bead or an inductor, among the plurality of pins and may transmit a signal obtained via the antenna 420 to an external electronic device through the first ground pin. The connection interface may obtain sound information corresponding to a signal from the external electronic device using the data pins and may emit a sound corresponding to the obtained sound information to the outside through the speaker 450.

Figure 5A:
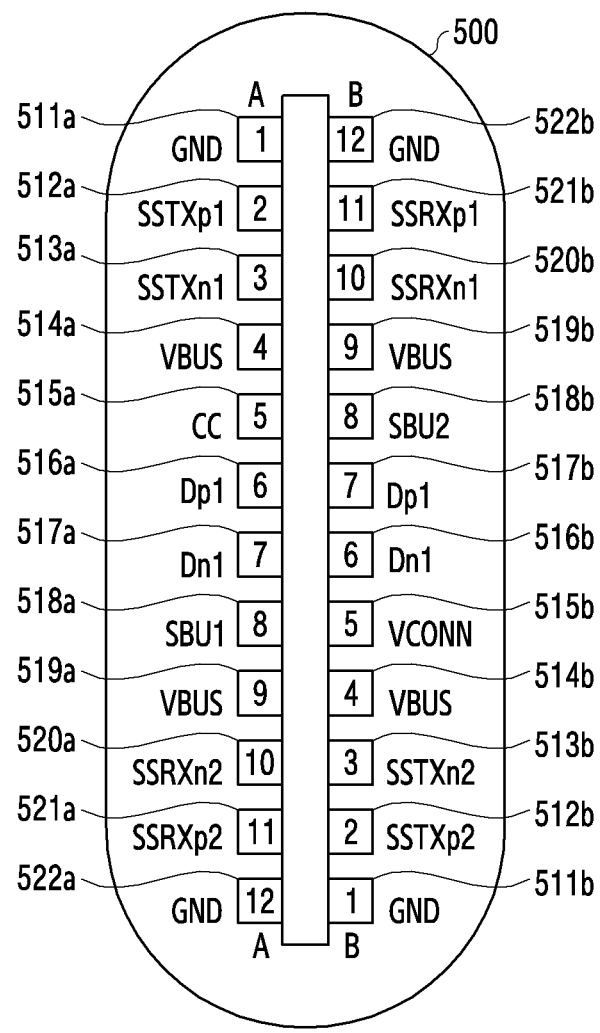

FIG. 5A and FIG. 5B illustrate pins of a connector according to various embodiments.

Referring to FIG. 5A, the connector 500 (e.g., the connection terminal 178 of FIG. 1, the connector 201-9 of FIG. 2, the connector 360 of FIG. 3, or the connector 410 of FIG. 4) according to various embodiments may be a USB Type-C connector. The connector 500 may include a plurality of pins. According to various embodiments, the connector 500 may include a plurality of pins (e.g., A pins) on an A surface corresponding to the forward direction and a plurality of pins (e.g., B pins) on a B surface corresponding to the reverse direction. For example, the plurality of A pins may include a GND pin 511a, an SSTXp1 pin 512a, an SSTXn1 pin 513a, a VBUS pin 514a, a CC pin 515a, a Dp1 pin 516a, a Dn1 pin 517a, an SBU1 pin 518a, a VBUS pin 519a, an SSRXn2 pin 520a, an SSRXp2 pin 521a, and a GND pin 522a. For example, the plurality of B pins may include a GND pin 511b, an SSTXp1 pin 512b, an SSTXn1 pin 513b, a VBUS pin 514b, a VCONN pin 515b, a Dp1 pin 516b, a Dn1 pin 517b, an SBU1 pin 518b, a VBUS pin 519b, an SSRXn2 pin 520b, an SSRXp2 pin 521b, and a GND pin 522b.

The plurality of A pins may include one or more first ground pins, for example, the GND pins 511a and 522a, and one or more A pins, for example, the SSTXp1 pin 512a, the SSTXn1 pin 513a, the VBUS pin 514a, the CC Pin 515a, the Dp1 pin 516a, the Dn1 pin 517a, the SBU1 pin 518a, the VBUS pin 519a, the SSRXn2 pin 520a, and the SSRXp2 pin 521a, and the plurality of B pins may include one or more second ground pins, for example, the GND pins 511b, 522b, and one or more B pins, for example, the SSTXp2 pin 512b, the SSTXn2 pin 513b, the VBUS pin 514b, the VCONN pin 515b, the Dp1 pin 516b, the Dn1 pin 517b, the SBU2 pin 518b, the VBUS pin 519b, the SSRXn1 pin 520b, and the SSRXp1 pin 521b.

Referring to FIG. 5B, the SSTXp1 pin and SSTXp2 pin 512a and 512b and the SSTXn1 pin and SSTXn2 pin 513a and 513b may be pins for super-speed transmission (TX) enabling fast data transmission, the Vbus pins 514a and 514b may be pins for USB cable charging power, the CC pin 515a may be a pin serving as an identification terminal, the Vconn pin 515b may be a pin for supporting power, the Dp1 pins 516a and 516b and the Dn1 pins 517a and 517b may be pins for different bidirectional USB signals, the SBU1 pin and SBU2 pin 518a and 518b may be spare pins which may be used for various signals (e.g., an audio signal, a display signal, or the like), and the SSRXn2 pin and the SSRXn1 pin 520a and 520b and the SSRXp2 pin and the SSRXp1 pin 521a and 521b may be pins for super-speed reception (RX) enabling fast data reception.

When receiving a broadcast signal, an electronic device according to various embodiments may implement an antenna (e.g., FM antenna) function by connecting an SBU pin of a USB Type-C connector and separating a GND. An SBU may be a line formed for use in different applications other than a main data line in a USB Type-C connector. Regarding a GND, a USB Type-C GND may be separated to minimize impact on high-speed USB communication.

The electronic device uses an SBU line as a DP AUX line. The AUX line may transmit an audio signal at a low frequency of 1 MHz or lower. Therefore, the AUX line is distant from a broadcast (e.g. FM or DMB) frequency domain, thus facilitating filtering, and may be less sensitive than a USB digital line. In addition, since the GND of the electronic device does not change, characteristics of the electronic device and an external antenna device may not be affected. A method using a GND may minimize the impact of USB characteristics by separating a GND line of an electronic device. Since USB Type-C enables reverse connection, GND may be designed in a pair (first ground and second ground).

Figure 6:
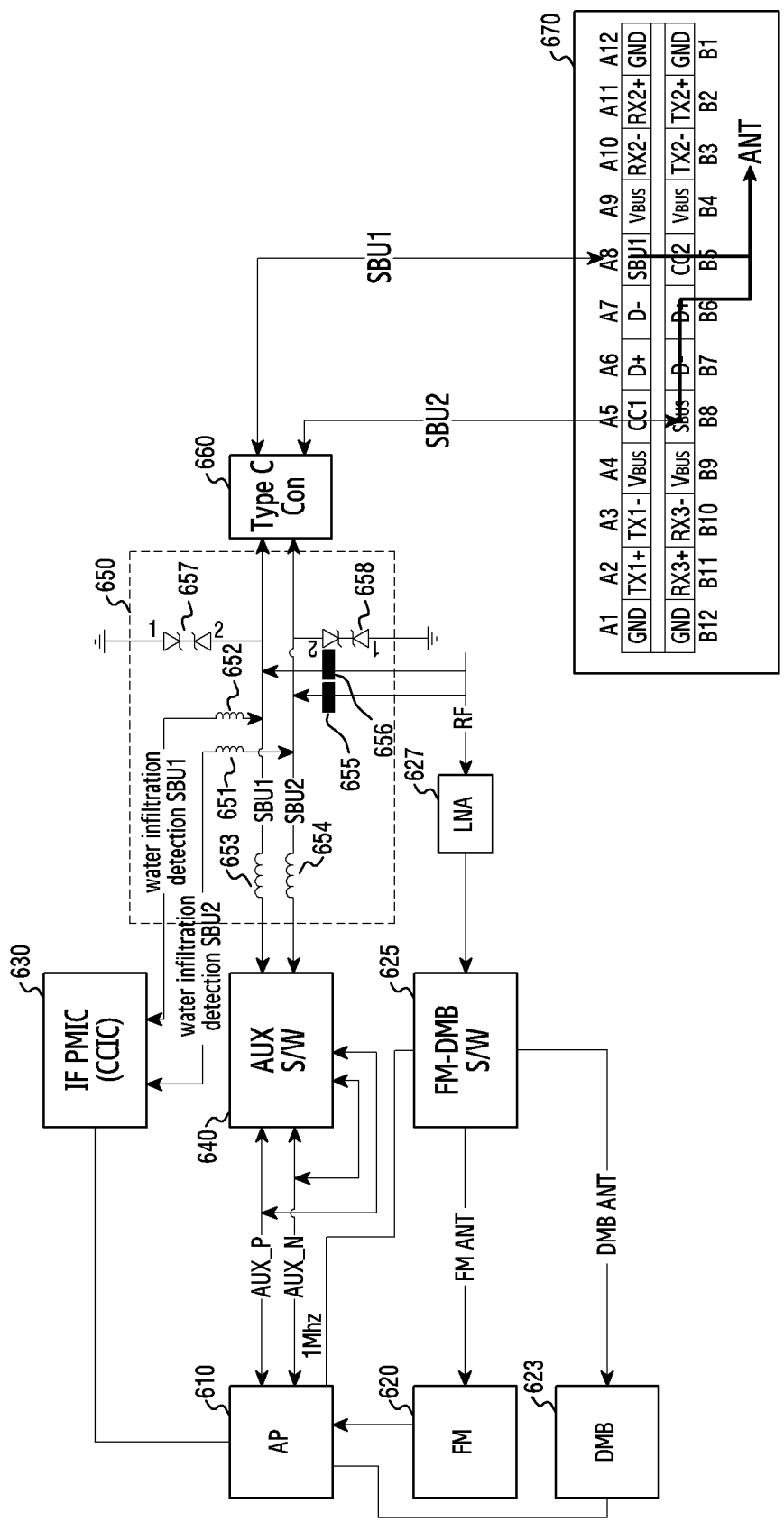
FIG. 6 illustrates an example of the configuration of an electronic device according to various embodiments.

FIG. 6 illustrates an example of the configuration of an electronic device according to various embodiments.

Referring to FIG. 6, the electronic device (e.g., the electronic device 101 of FIG. 1, the electronic device 201 of FIG. 2, or FIG. 3) may include a processor 610, an FM reception module 620, a DMB reception module 623, an IF PMIC 630, an AUX switch 640, a broadcast selection switch 625, a low-noise amplifier (LNA) 627, a signal blocking circuit 650, and a connector 660. A connector 670 may be a connector of an external antenna device.

The connector 660 in a Type-C form may have the same structure as that illustrated in FIG. 5A and may have the same pin characteristics as those illustrated in FIG. 5B. An antenna (e.g., the antenna 420 of FIG. 4) of the external antenna device may be connected to an SBU1 pin and an SBU2 pin of the connector 670. The SBU1 pin and the SBU2 pin of the connector 670 may be connected to the IF PMIC 630, the AUX switch 640, and the LNA 627 through the signal blocking circuit 650.

The signal blocking circuit 650 (e.g., the signal block module 350 of FIG. 3) may include inductors 651 and 652 connected to respective SBU1 and SBU2 lines and the IF PMIC 630, inductors 653 and 654 connected to the respective SBU1 and SBU2 lines and the AUX switch 640, capacitors 655 and 656 connected to the respective SBU1 and SBU2 lines and the LNA 627, and electrostatic discharge (ESD) diodes 657 and 658 connected to the respective SBU1 and SBU2 lines and the ground. The inductors 651 and 652 may block broadcast signals of the SBU1 and SBU2 lines from being applied to the IF PMIC 630, and the inductors 653 and 654 may block the broadcast signals of the SBU1 and SBU2 lines from being applied to the AUX switch 640. The capacitors 655 and 656 may perform DC blocking so that a signal of an AUX line is not applied to the LNA 627. The ESD diodes 657 and 658 may perform a function of ESD protection of the SBU1 and SBU2 lines.

The IF PMIC 630 (e.g., the connection detection module 310 of FIG. 3) may detect water infiltrating into the Type-C connector in a state where the Type-C connector 670 is not connected to the connector 660. The IF PMIC 630 may perform a CCIC function when the Type-C connector 670 is connected to the connector 660.

The AUX switch 640 may perform AUX switching when the connector 670 is reversibly connected to the connector 660.

The FM reception module 620, the DMB reception module 623, and the broadcast selection switch 625 may be a broadcast reception module (e.g., the broadcast reception module 340 of FIG. 4). The broadcast reception module may include both FM and DMB or may include only one broadcast thereof. In addition, the broadcast reception module may include broadcasts (e.g., an Internet mobile TV or the like) other than FM and DMB. The broadcast reception module may further include a low-noise amplifier (LNA) 627 to perform low-noise amplification of a received broadcast signal and to apply the broadcast signal to the broadcast selection switch 625.

The processor 610 may be an application processor (AP). The processor 610 may receive signals from the IF PMIC 630, the AUX switch 640, the FM reception module 620, and the DMB reception module 623. When the connector 670 is not connected to the connector 660 (no external device is connected to the Type-C connector), the IF PMIC 630 is in an enabled state, and the processor 610 may determine whether water infiltrates into the connector, based on an output from the IF PMIC 630. When the connector 670 is connected to the connector 660, the processor 610 may recognize the product ID (PID) of a connected external device, based on a CCIC. Here, when the connected external device is a DP, the processor 610 may control the AUX switch 640 to be turned on and the IF PMIC 630 and the broadcast selection switch 625 to be turned off.

When the connected external device is an external antenna device, the processor 610 may turn off the IF PMIC 630 and the AUX switch 640 and may analyze an executed broadcast. When the executed broadcast is an FM broadcast, the processor 610 may control the broadcast selection switch 625 to perform switching connection of an output from the LNA 627 to the FM reception module 620. Then, an FM broadcast signal received by the antenna of the external antenna device may be transmitted to the LNA 627 through the SBU pins of the connector 670 and the SBU pins of the connector 660, and the FM broadcast signal, which has been low-noise amplified by the LNA 627, may be processed by the FM reception module 620 through the broadcast selection switch 625. Alternatively, when the executed broadcast is a DMB broadcast, the processor 610 may control the broadcast selection switch 625 to perform switching connection of an output from the LNA 627 to the DMB reception module 623. Then, a DMB broadcast signal received by the antenna of the external antenna device may be transmitted to the LNA 627 through the SBU pins of the connector 670 and the SBU pins of the connector 660, and the DMB broadcast signal, which has been low-noise amplified by the LNA 627, may be processed by the DMB reception module 623 through the broadcast selection switch 625.

The electronic device may process DP AUX and broadcast reception functions in common, based on the USB Type-C connector. In the configuration illustrated in FIG. 6, the operating state of each component may be illustrated below in Table 1.

TABLE 1

| Operating mode | CC state | AUX switch | Broadcast selection switch | IF PMIC |
|---|---|---|---|---|
| Not use | — | off | off | on |
| DP | DP conf. | on | off | off |
| FM | External antenna | off | FM | off |
| DMB | External antenna | off | DMB | off |

Figure 7A:
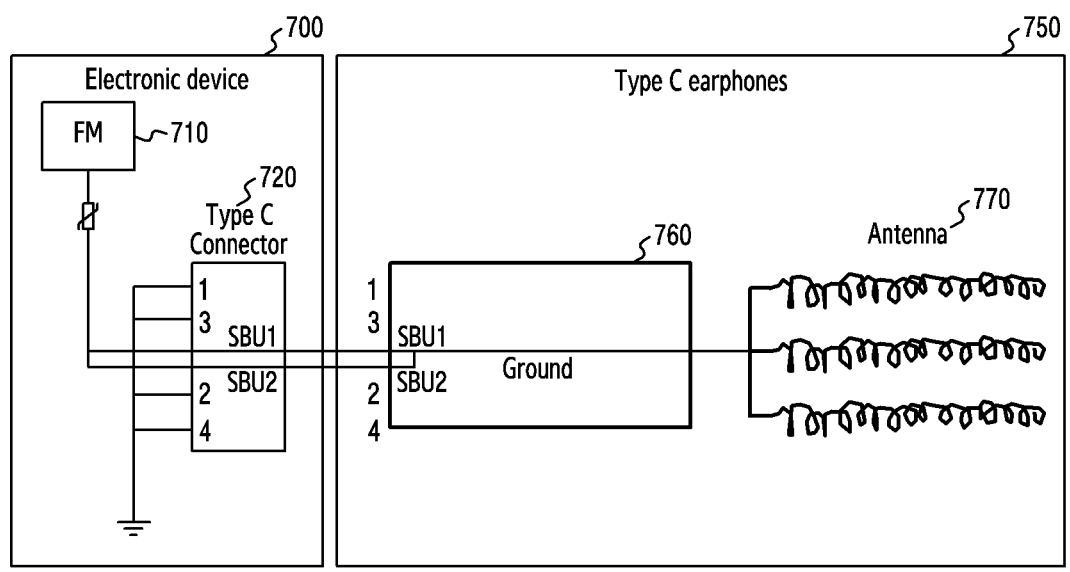
FIG. 7A and FIG. 7B illustrate an example of using an SBU line of a Type-C connector as an antenna according to various embodiments.
Figure 7B:
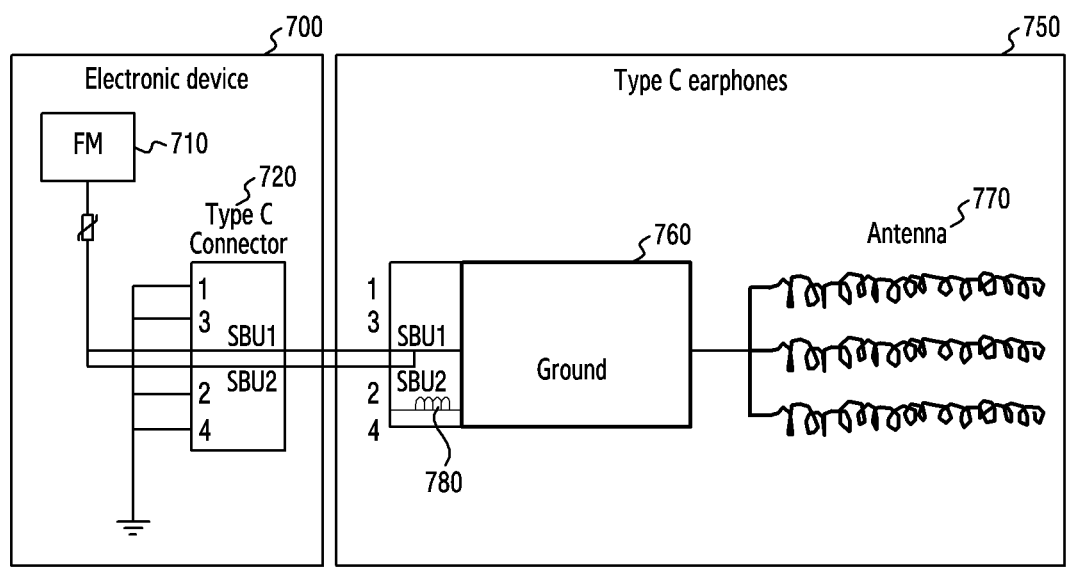

FIG. 7A and FIG. 7B illustrate an example of using an SBU line of a Type-C connector as an antenna according to various embodiments.

Referring to FIG. 7A and FIG. 7B, an electronic device 700 (e.g., the electronic device 101 of FIG. 1, the electronic device 201 of FIG. 2, or FIG. 3) may include an FM reception module 710 (e.g., the broadcast reception module 340 of FIG. 3 or the FM reception module 620 in FIG. 6) and a Type-C connector 720 (e.g., the connection terminal 178 of FIG. 1, the connector 201-9 of FIG. 2, the connector 360 of FIG. 3, FIG. 5A, or the connector 660 of FIG. 6). An external antenna device 750 (e.g., the electronic device 102 of FIG. 1 or FIG. 4) may include a connector (e.g., the connector 20-9 of FIG. 2, the connector 410 of FIG. 4, FIG. 5A, or the connector 670 of FIG. 6) and an antenna 770 (e.g., the antenna 420 of FIG. 4).

Referring to FIG. 7A, the electronic device 700 and the external antenna device 750 may use an SBU line as an antenna. The antenna 770 of the external antenna device 750 may be connected to SBU1 and SBU2 pins of the connector 760. Further, a first ground pin and a second ground pin (e.g., in FIG. 5A, the first ground pin may be GND A1 and GND B1, and the second ground pin may be GND A12 and GND B12) of the connector 760 may be directly connected to the ground. When the connector 760 of the external antenna device 750 is connected to the connector 720 of the electronic device 700, SBU1 and SBU2 pins of the connector 760 and the connector 720 are connected, and thus an FM signal received by the antenna 770 may be applied to the FM reception module 710 through SBU1 and SBU2 lines.

Referring to FIG. 7B, the electronic device 700 and the external antenna device 750 may use a first ground line and an SBU line as an antenna. The antenna 770 of the external antenna device 750 may be connected to SBU1 and SBU2 pins of the connector 760. A first ground pin (e.g., in FIG. 5A, the first ground pin includes GND A1 and GND B1 pins) of the connector 760 may be connected to SBU1 and SBU2 lines and may be connected to the ground through a blocking element. The blocking element may be connected to the first ground pin and a ground part and may function to block a broadcast signal applied to a first ground line from being applied to the ground part. The blocking element may be configured as a bead or inductor. In the following description, a bead is illustrated as an example of the blocking element. As illustrated in FIG. 7B, the first ground pin of the connector 760 may be connected to the SBU1 and SBU2 lines and may be connected to the ground through the bead 780. A second ground pin (e.g., GND A12 and GND B12 pins in FIG. 5A) of the connector 760 may be directly connected to the ground. Therefore, since the first ground lines are separated from the ground by the bead 780 to be connected to the SBU1 and SBU2 lines, the SBU lines and the first ground line may be used as an antenna. When the connector 760 of the external antenna device 750 is connected to the connector 720 of the electronic device 700, SBU1 and SBU2 pins of the connector 760 and the connector 720 are connected, and an FM signal received by the antenna 770 may be applied to the FM reception module 710 through the first ground line and the SBU1 and SBU2 lines.

Figure 8:
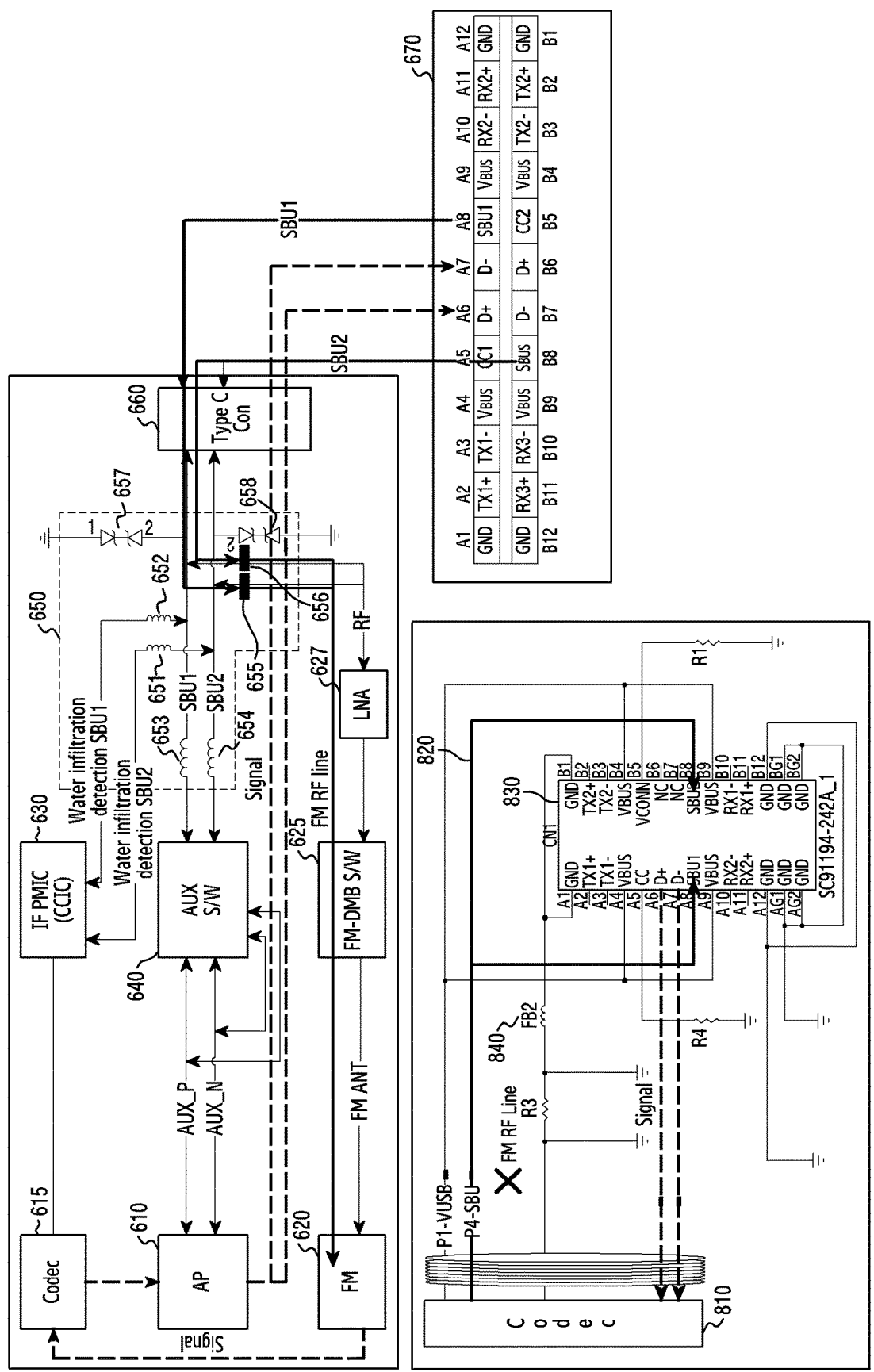
FIG. 8 illustrates an example in which an electronic device and an earphone device configure an FM antenna through an SBU line of a Type-C connector according to various embodiments.

FIG. 8 illustrates an example in which an electronic device and an external antenna device configure an FM antenna through an SBU line of a Type-C connector according to various embodiments. FIG. 8 illustrates an example of configuring an SBU line as an antenna as in FIG. 7A.

Referring to FIG. 8, the electronic device (e.g., the electronic device 101 of FIG. 1, the electronic device 201 of FIG. 2, or FIG. 3) may include a processor 610, a codec 615, an FM reception module 620, a DMB reception module 623, an IF PMIC 630, an AUX switch 640, a broadcast selection switch 625, a low-noise amplifier (LNA) 627, a signal blocking circuit 650, and a connector 660. A connector 670 may be a connector of the external antenna device. In the configuration of the electronic device, the codec 615 may be included in the processor 610.

The external antenna device (e.g., FIG. 4) may include a codec 810, an antenna 820, and a connector 830. The codec 810 (e.g., the signal processing module 430 of FIG. 4) may be connected to a D+ pin and a D− pin of the connector 830 (e.g., the connector 20-9 of FIG. 2, the connector 410 of FIG. 4, or FIG. 5) and may process a broadcast signal of the electronic device received through the connector 830 to output the broadcast signal to a speaker (the speaker 450 of FIG. 4). The antenna 820 (the antenna 420 of FIG. 4) may be connected to an SBU1 pin and an SBU 2 pin of the connector 830. A first ground pin (GND A1 and GND B1 pins) may be connected to the ground through a bead 840, and a second ground pin (GND A12 and GND B12 pins) may be directly connected to the ground. The bead 840 may be replaced with a different blocking element. For example, an inductor may be configured as the bead 840.

When the connector 830 and the connector 660 are connected, a broadcast signal (e.g., an FM signal) received through the antenna 820 may be applied to the FM reception module 620 of the electronic device through an SBU1 line and an SBU2 line, as indicated by a bold solid line. The FM broadcast signal may be applied to the processor 610 via the FM reception module 620 and the codec 615. The processor 610 may apply the FM signal, received from the external antenna device, to D+ and D− pins of the connector 660. The FM signal applied to the connector 660 may be applied to the codec 810 of the external antenna device through the D+ and D− pins of the connector 830. The FM signal processed by the electronic device may have a processing path indicated by a bold dotted line.

The electronic device and the external antenna device configured as illustrated in FIG. 8 may receive a broadcast signal (e.g., an FM signal) through an SBU line of a path indicated by a bold solid line, and may reproduce the broadcast signal through a high-speed data line (D+ and D− lines) of a path indicated by a bold dotted line.

Figure 9:
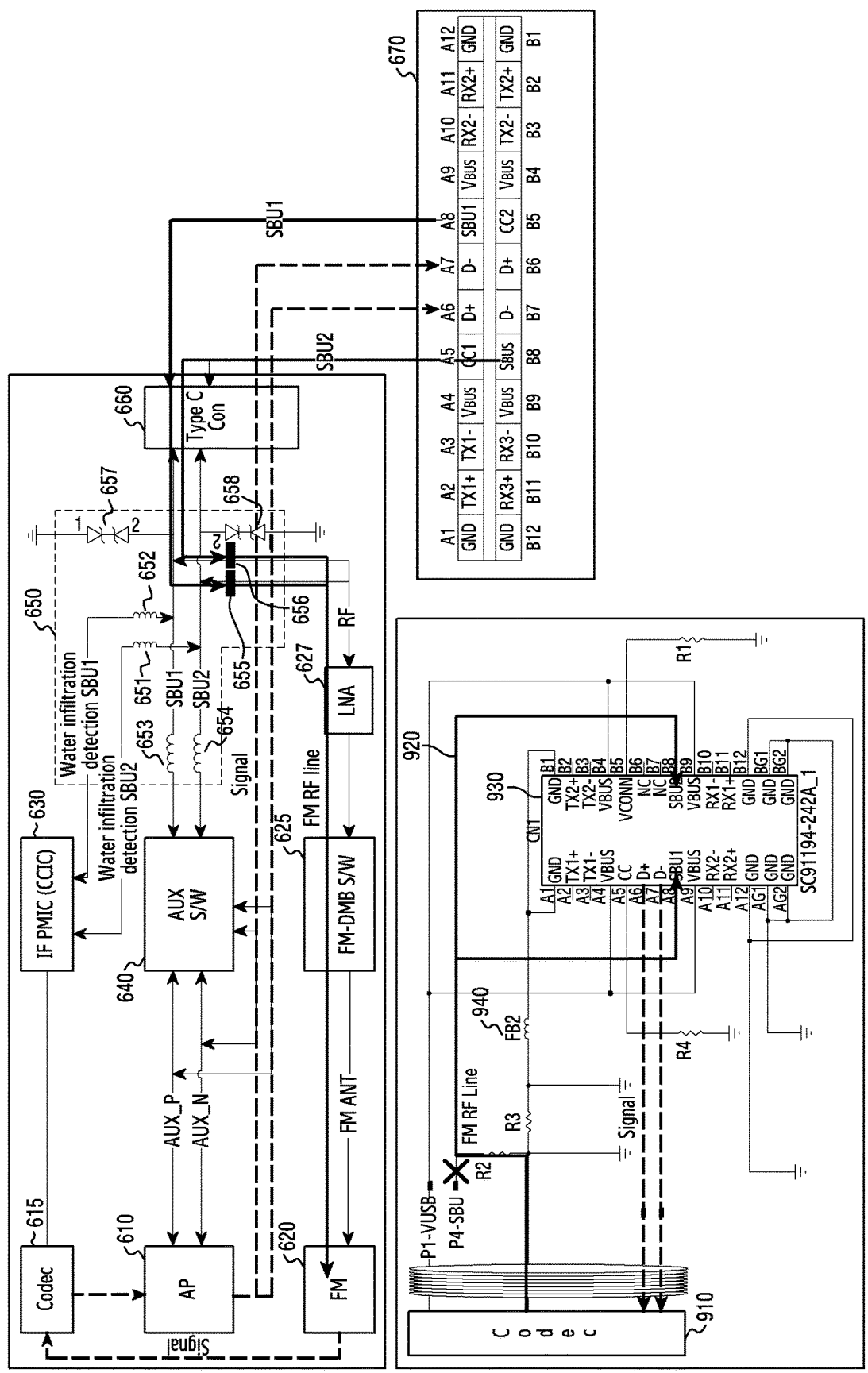
FIG. 9 illustrates an example in which an electronic device and an earphone device configure an FM antenna through an SBU line and a ground line of a Type-C connector according to various embodiments.

FIG. 9 illustrates an example in which an electronic device and an external antenna device configure an FM antenna through an SBU line and a ground line of a Type-C connector according to various embodiments. FIG. 9 illustrates an example of configuring an SBU line and a first ground line as an antenna as in FIG. 7B.

Referring to FIG. 9, the electronic device (e.g., the electronic device 101 of FIG. 1, the electronic device 201 of FIG. 2, or FIG. 3) may include a processor 610, a codec 615, an FM reception module 620, a DMB reception module 623, an IF PMIC 630, an AUX switch 640, a broadcast selection switch 625, a low-noise amplifier (LNA) 627, a signal blocking circuit 650, and a connector 660. A connector 670 may be a connector of the external antenna device. In the configuration of the electronic device, the codec 615 may be included in the processor 610.

The external antenna device (e.g., FIG. 4) may include a codec 910, an antenna 920, and a connector 930. The codec 910 (e.g., the signal processing module 430 of FIG. 4) may be connected to a D+ pin and a D− pin of the connector 930 (e.g., the connector 20-9 of FIG. 2, the connector 410 of FIG. 4, or FIG. 5A) and may process a broadcast signal of the electronic device received through the connector 930 to output the broadcast signal to a speaker (the speaker 450 of FIG. 4). The antenna 920 (the antenna 420 of FIG. 4) may be connected to an SBU1 pin and an SBU 2 pin of the connector 930. A first ground pin (GND A1 and GND B1 pins) may be connected to an SBU line and may be connected to the ground through a bead 940. A second ground pin (GND A12 and GND B12 pins) may be directly connected to the ground. The bead 940 may be replaced with a different blocking element. For example, an inductor may be configured as the bead 940.

When the connector 930 and the connector 660 are connected, the external antenna device may receive a broadcast signal (e.g., an FM signal) through the antenna 920 including a first ground line and an SBU line indicated by a bold solid line. The broadcast signal received through the antenna 920 may be applied to the connector 660 of the electronic device through the SBU1 pin and the SBU2 pin of the connector 930, as indicated by a bold solid line. The FM broadcast signal received through an SBU1 pin and an SBU2 pin of the connector 660 may be applied to the processor 610 via the FM reception module 620 and the codec 615. The processor 610 may apply the FM signal, received from the external antenna device, to D+ and D− pins of the connector 660. The FM signal applied to the connector 660 may be applied to the codec 910 of the external antenna device through the D+ and D− pins of the connector 930. The FM signal processed by the electronic device may have a processing path indicated by a bold dotted line.

The electronic device and the external antenna device configured as illustrated in FIG. 9 may receive a broadcast signal (e.g., an FM signal) through the first ground line and the SBU line of a path indicated by a bold solid line, and may reproduce the broadcast signal through a high-speed data line (D+ and D− lines) of a path indicated by a bold dotted line.

An electronic device according to various embodiments may include a broadcast reception module, a connector configured to include a first pin and a second pin, and a processor. The processor may be configured to: identify, through the first pin, a type of an external electronic device connected through the connector; drive the broadcast reception module with an external antenna included in the external electronic device and the broadcast reception module electrically connected through the first pin when the type of the external electronic device corresponds to a specified electronic device type; receive a broadcast signal using the broadcast reception module from the external antenna; and output an audio signal generated based at least partly on the broadcast signal to a specified device through the second pin.

The connector may be a Type-C socket connector, the first pin may be a sideband use (SBU) pin, and the second pin may be D+ and D− pins.

The broadcast reception module may be an FM broadcast reception module.

The electronic device may further include a connection detection module configured to be connected to the SBU pin of the connector and to be turned off when the external electronic device is connected to the connector, wherein the processor may detect connection of the external connection device, based on turnoff of the connection detection module.

The electronic device may further include an AUX switch configured to be connected to the SBU pin of the connector and the processor and to perform AUX switching when a pin of a display port (DP) plug connector is inserted in a reverse direction.

The broadcast reception module may include: a broadcast selection switch configured to be connected to the SBU pin of the connector; an FM broadcast reception module configured to be connected to the broadcast selection switch; and a DMB broadcast reception module configured to be connected to the broadcast selection switch. The processor may connect an output from the broadcast selection switch to a corresponding broadcast reception module, based on a broadcast application being executed when connection of the external antenna to the connector is detected.

An electronic device according to various embodiments may include: at least one speaker configured to emit a sound; an antenna; and a connection interface configured to be electrically connected to the antenna and to include a plurality of pins for connecting to an external electronic device. The connection interface may: be connected to the antenna using a specified first pin among the plurality of pins, at least a portion of the antenna being connected to at least one ground part; transmit a signal obtained via the antenna to the external electronic device through the first pin; and obtain sound information corresponding to the signal from the external electronic device using a specified second pin among the plurality of pins and emit a sound corresponding to the obtained sound information to the outside through the speaker.

The connection interface may be a Type-C plug connector, the first pin may be a sideband use (SBU) pin, and the second pin may be D+ and D− pins.

The connection interface may further include a first ground pin and a second ground pin, a first ground line connected to the first ground pin may be connected to an SBU line connected to the SBU pin and may be connected to the ground part through a bead or an inductor, a second ground line connected to the second ground pin may be directly connected to the ground part, and the antenna may include the SBU line and the first ground line.

The first ground pin may be GND A1 and GND B1 of the plug connector, and the second ground pin may be GND A12 and GND B12 of the plug connector.

The first ground pin may be GND A12 and GND B12 of the plug connector, and the second ground pin may be GND A1 and GND B1 of the plug connector.

Figure 10A:
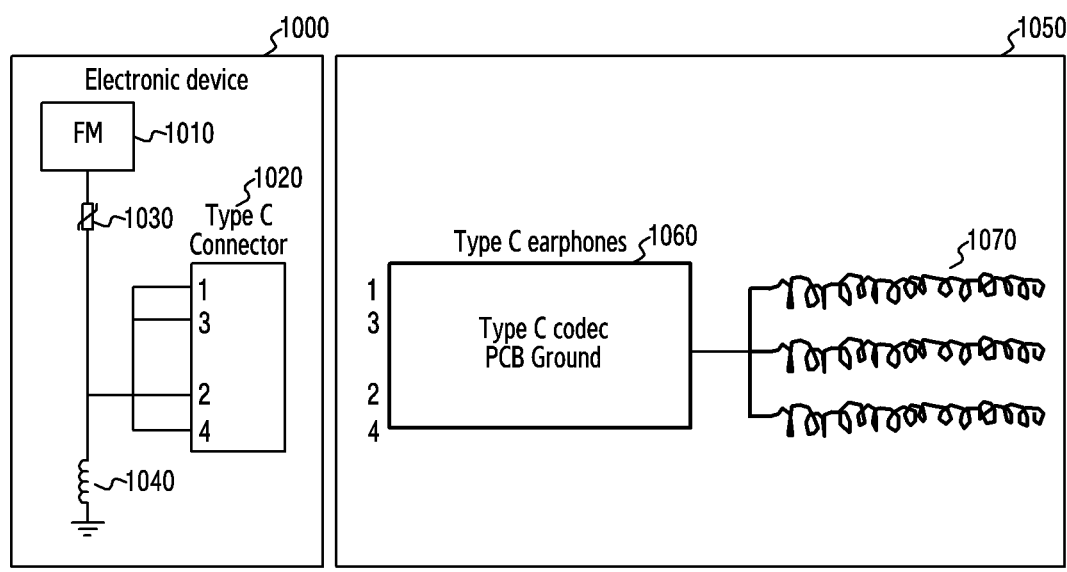
FIG. 10A to FIG. 10C illustrate an example of using a ground line of a Type-C connector as an antenna according to various embodiments.
Figure 10B:
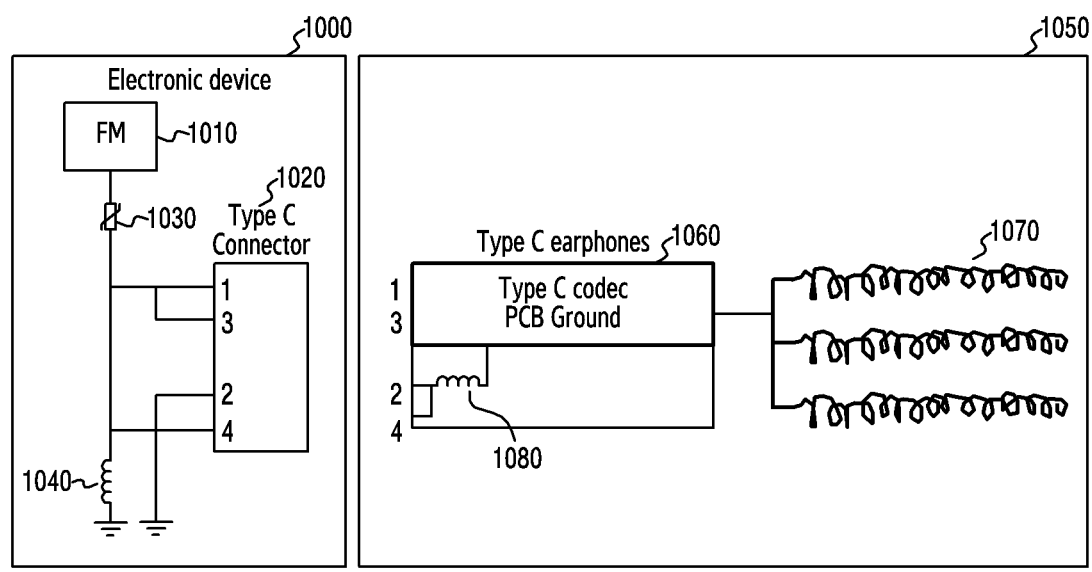
Figure 10C:
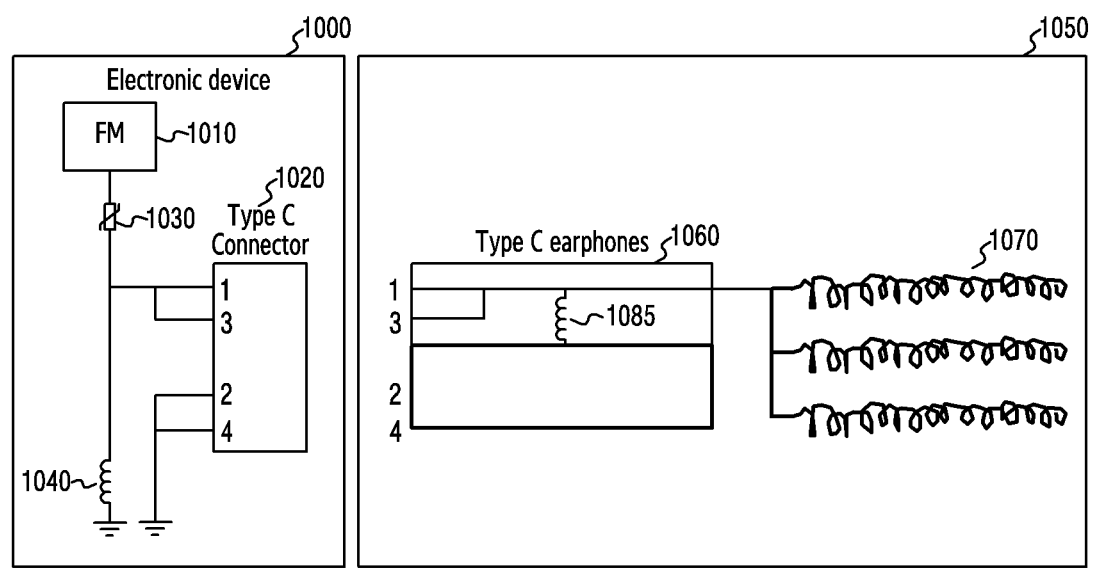

FIG. 10A to FIG. 10C illustrate an example of using a ground line of a Type-C connector as an antenna according to various embodiments.

Referring to FIG. 10A to FIG. 10C, an electronic device 1000 (e.g., the electronic device 101 of FIG. 1 of FIG. 1, the electronic device 201 of FIG. 2, or FIG. 3) may include an FM reception module 1010 (e.g., the broadcast reception module 340 of FIG. 3 or the FM reception module 620 of FIG. 6), a Type-C connector 1020 (e.g., the connection terminal 178 of FIG. 1, the connector 201-9 of FIG. 2, the connector 360 of FIG. 3, FIG. 5A, or the connector 660 of FIG. 6), a varistor 1030, and a bead 1040.

An external antenna device 1050 (e.g., the electronic device 102 of FIG. 1 or FIG. 4) may include a connector (e.g., the connector 20-9 of FIG. 2, the connector 410 of FIG. 4, FIG. 5A, or the connector 670 of FIG. 6), an antenna 1070 (e.g., the antenna 420 of FIG. 4), and a bead 1080 and 1085.

Referring to FIG. 10A to FIG. 10C, the beads 1040, 1080, and 1085 may be a blocking element connected to a ground pin and the ground part. The blocking element may serve to block a broadcast signal of a ground line connected to the ground pin from being applied to the ground part. The blocking element may be configured with a bead or an inductor. In the following description, a bead is used as a blocking element.

Referring to FIG. 10A, the ground of the electronic device may be connected to the ground through the bead 104, and the ground of the external antenna device 1050 may be used as an antenna. The FM reception module 1010 of the electronic device may be connected to a ground pin of the connector 1020 through the varistor 1030, and a ground line of the connector 1020 may be connected to the ground through the bead 1040. The antenna 1070 of the external antenna device 1050 may be connected to a ground pin of the connector 1060, and the ground pin may be connected to a PCB ground of the external antenna device. When the connector 1060 of the external antenna device 1050 is connected to the connector 1020 of the electronic device 1000, the ground pins of the connector 1060 and the connector 1020 are connected, and thus an FM signal received through the antenna 1070 may be applied to the FM reception module 1010 through the ground line.

The ground pin of the electronic device 1000 may be connected to the ground through the bead. The ground pin of the external antenna device may be directly connected to the ground of the electronic device, and thus a ground line of the external antenna device may be used as an antenna.

Referring to FIG. 10B, a ground line of the electronic device may be divided, wherein a first ground line may be connected to the ground through the bead 1080, and a second ground line may be directly connected to the ground so that a ground line and a plane of the external antenna device may be used as an antenna for broadcast reception.

A first ground pin (e.g., in FIG. 5A, the first ground pin is the GND A1 and GND B1 pins) of the connector 1060 may be connected to the antenna 1070 and may be connected to the ground through the bead 1080. A second ground pin (e.g., the GND A12 and GND B12 pins in FIG. 5A) of the connector 1060 may be directly connected to the ground. Accordingly, since the first ground lines are separated from the ground by the bead 1080 and are connected to the antenna 1070, the first ground lines may be used as an antenna. When the connector 1060 of the external antenna device 1050 is connected to the connector 1020 of the electronic device 1000, an FM signal received through the antenna 1070 may be applied to the FM reception module 1010 through the first ground line.

A ground line of a terminal may be divided, wherein a first ground line may be connected to the ground through a bead, and a second ground line may be directly connected to the ground. Therefore, the external antenna device may use the ground line and a plane as an antenna.

Referring to FIG. 10C, a ground line of the electronic device may be divided, wherein a second ground line may be connected to the ground through the bead 1085, and a first ground line may be directly connected to the ground so that a ground line and a plane of the external antenna device may be used as an antenna for broadcast reception.

A second ground pin (e.g., in FIG. 5A, the second ground pin is the GND A12 and GND B12 pins) of the connector 1060 may be connected to the antenna 1070 and may be connected to the ground through the bead 1085. A first ground pin (e.g., the GND A1 and GND B1 pins in FIG. 5A) of the connector 1060 may be directly connected to the ground. Accordingly, since the second ground lines are separated from the ground by the bead 1085 and are connected to the antenna 1070, the second ground lines may be used as an antenna. When the connector 1060 of the external antenna device 1050 is connected to the connector 1020 of the electronic device 1000, an FM signal received through the antenna 1070 may be applied to the FM reception module 1010 through the second ground line.

A ground line of a terminal may be divided, wherein a first ground line may be connected to the ground through a bead, and a second ground line may be directly connected to the ground. The external antenna device may use the ground line as an antenna.

Figure 11:
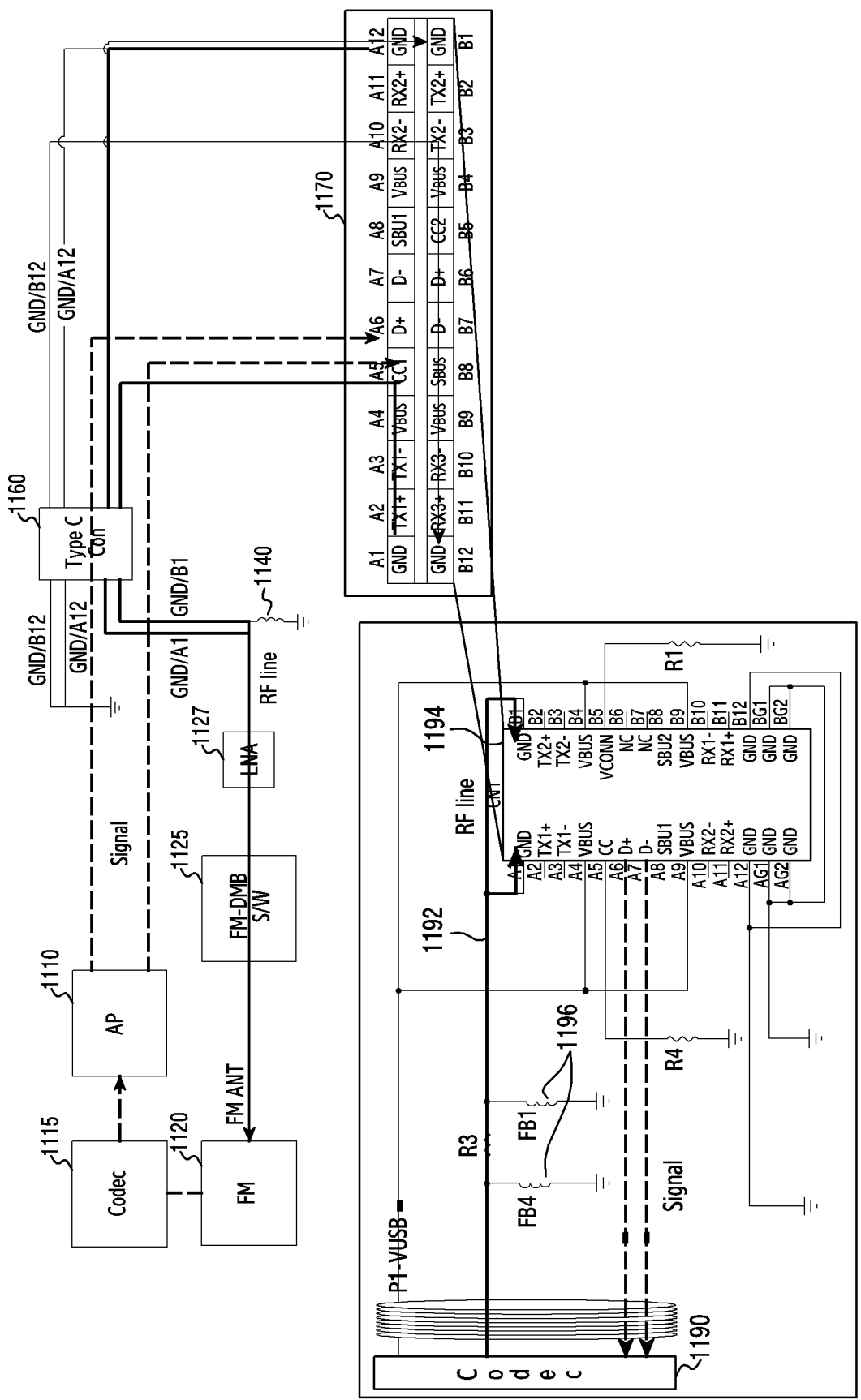
FIG. 11 illustrates an example in which an electronic device and an earphone device configure an FM antenna through a ground line of a Type-C connector according to various embodiments.

FIG. 11 illustrates an example in which an electronic device and an external antenna device configure an FM antenna through a ground line of a Type-C connector according to various embodiments. FIG. 11 illustrates an example of configuring a first ground line as an antenna as in FIG. 10C.

Referring to FIG. 11, the electronic device (e.g., the electronic device 101 of FIG. 1, the electronic device 201 of FIG. 2, or FIG. 3) may include a processor 1110, a codec 1115, an FM reception module 1120, a broadcast selection switch 1125, a low-noise amplifier (LNA) 1127, a connector 1160, and a bead 1140. The configuration of the electronic device of FIG. 11 may be a structure in which a DMB reception module, an IF PMIC, an AUX switch, and a signal blocking circuit are omitted from the configuration of the electronic device of FIG. 6. In FIG. 11, a connector 1170 may be a connector of the external antenna device. In the configuration of the electronic device, the codec 1115 may be included in the processor 1110. The external antenna device (e.g., FIG. 4) may include a codec 1190, an antenna 1192, and a connector 1194.

A first ground pin (GND A1 and GNS B1) of the connector 1160 of the electronic device may be connected to the ground through the bead 1140 and may be connected to the LNA 1127 through a varistor not shown. A second ground pins (GND A12 and GNS B12) of the connector 1160 may be directly connected to the ground.

The codec 1190 (e.g., the signal processing module 430 of FIG. 4) of the external antenna device may be connected to a D+ pin and a D− pin of the connector 1194 (e.g., the connector 20-9 of FIG. 2, the connector 410 of FIG. 4, or FIG. 5) and may process a broadcast signal of the electronic device received through the connector 1194 to output the broadcast signal to a speaker (the speaker 450 of FIG. 4). The antenna 1192 (the antenna 420 of FIG. 4) may be connected to a first ground pin (GND A1 and GND B1 pins) of the connector 1194, and the first ground pin (GND A1 and GND B1 pins) may be connected to the ground through a bead 1196. A second ground pin (GND A12 and GND B12 pins) of the connector 1194 may be directly connected to the ground.

When the connector 1194 and the connector 1160 are connected, a broadcast signal (e.g., an FM signal) received through the antenna 1192 may be applied to the FM reception module 1120 of the electronic device through a first ground line, as indicated by a bold solid line. The FM broadcast signal may be applied to the processor 1110 via the FM reception module 1120 and the codec 1115. The processor 1110 may apply the FM signal, received from the external antenna device, to D+ and D− pins of the connector

1160. The FM signal applied to the connector 1160 may be applied to the codec 1190 of the external antenna device through the D+ and D-pins of the connector 1194. The FM signal processed by the electronic device may have a processing path indicated by a bold dotted line.

FIG. 11 illustrates an example in which the first ground line is used as an antenna by connecting the first ground pin (GND A1 and GND B1) of the connector 1160 of the electronic device and the first ground pin (GND A1 and GND B1) of the connector 1194 of the external antenna device to the ground through the bead 1140 and the bead 1196, respectively, and connecting the second ground pin (GND A12 and GND B12) of the connector 1160 and the second ground pin (GND A12 and GND B12) of the connector 1194 of the external antenna device directly to the ground. Alternatively, a second ground line may be used as an antenna by connecting the first ground pin (GND A1 and GND B1) of the connector 1160 of the electronic device and the first ground pin (GND A1 and GND B1) of the connector 1194 of the external antenna device directly to the ground and connecting the second ground pin (GND A12 and GND B12) of the connector 1160 and the second ground pin (GND A12 and GND B12) of the connector 1194 of the external antenna device to the ground through the respective beads. The bead 1140 and the bead 1196 may be replaced with inductors.

An electronic device according to various embodiments may include a broadcast reception module, a connector configured to include a first ground pin, a second ground pin, and a data pin, a bead or an inductor configured to be connected to the first ground pin and the ground and to block a broadcast signal of a ground line from flowing to the ground, and a processor. The processor may be configured to: identify a type of an external electronic device through the connector; drive the broadcast reception module with an external antenna included in the external electronic device and the broadcast reception module electrically connected through the first ground pin when the type of the external electronic device corresponds to a specified electronic device type; receive a broadcast signal using the broadcast reception module from the external antenna; and output an audio signal generated based at least partly on the received broadcast signal to a specified device through the data pin.

The broadcast reception module may be an FM broadcast reception module.

An electronic device according to various embodiments may include: at least one speaker configured to emit a sound; an antenna; and a connection interface configured to be electrically connected to the antenna and to include a plurality of pins for connecting to an external electronic device. The connection interface may: be connected to the antenna using a first ground pin connected to a ground part through a bead among the plurality of pins; transmit a signal obtained via the antenna to the external electronic device through the first ground pin; and obtain sound information corresponding to the signal from the external electronic device using a data pin and emit a sound corresponding to the obtained sound information to the outside through the speaker.

The connection interface may be a Type-C plug connector. In the connection interface, a first ground line connected to the first ground pin and a PCB plane may be connected to the ground part through the bead or an inductor, and a second ground pin may be directly connected to the ground part.

In the connection interface, the first ground line connected to the first ground pin may be connected to the ground part through the bead or the inductor, and the second ground pin may be directly connected to the ground part.

Figure 12:
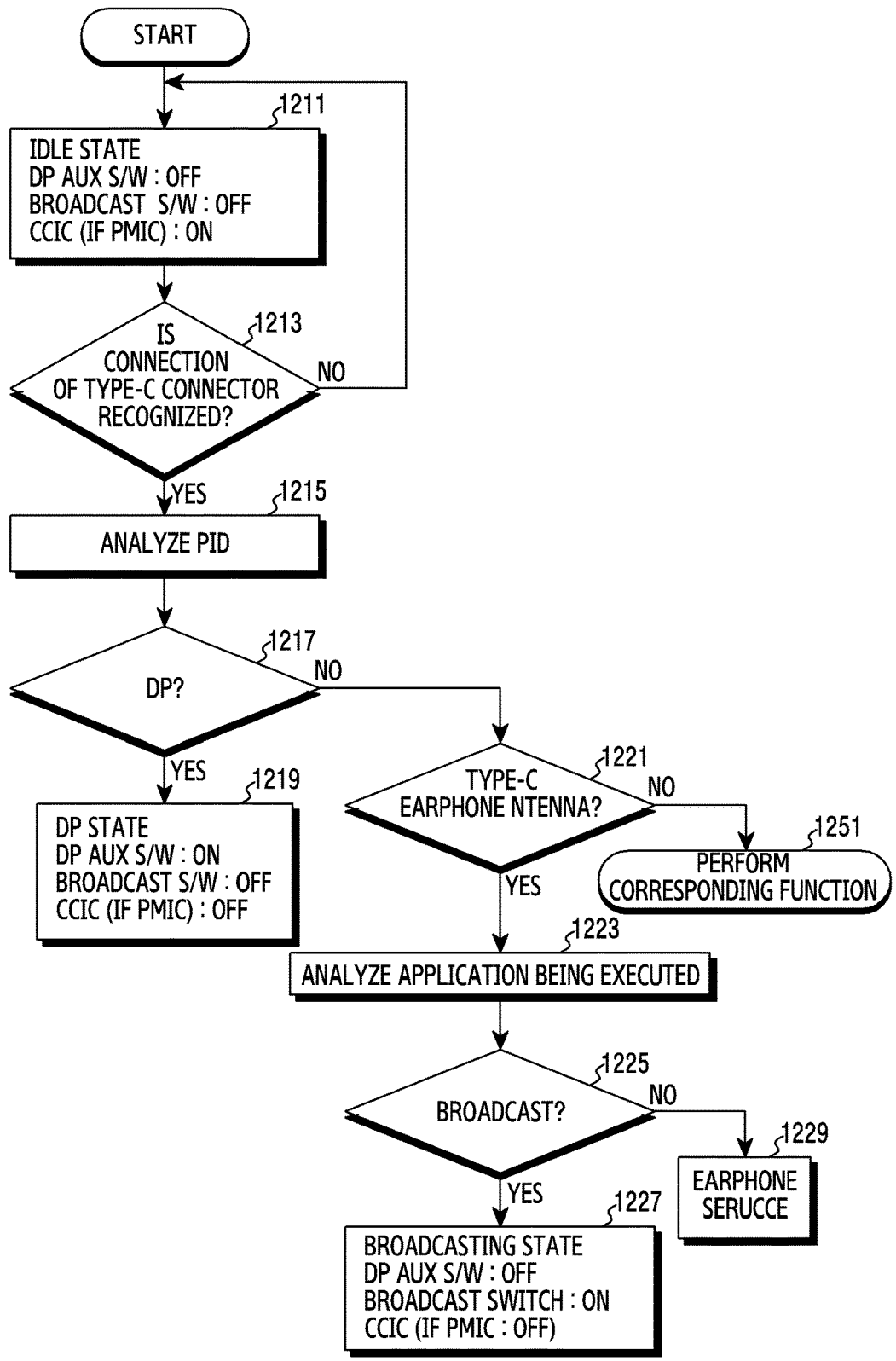
FIG. 12 is a flowchart illustrating a procedure in which an electronic device processes a signal received through an antenna using a Type-C connector according to various embodiments.

FIG. 12 is a flowchart illustrating a procedure in which an electronic device processes a signal received through an antenna using a Type-C connector according to various embodiments.

Referring to FIG. 12, when a connector (e.g., the connector 20-9 of FIG. 2, the connector 410 of FIG. 4, FIG. 5A, or the connector 670 of FIG. 6) is connected to a Type-C connector (e.g., the connection terminal 178 of FIG. 1, the connector 201-9 of FIG. 2, the connector 360 of FIG. 3, FIG. 5A, or the connector 660 of FIG. 6), an electronic device (e.g., the electronic device 101 of FIG. 1, the electronic device 201 of FIG. 2, FIG. 3, or FIG. 6) may recognize a connected external device, based on a CCIC.

In a state where no connector is connected to the Type-C connector (idle state), the electronic device may turn on the CCIC (e.g., the IF PMIC 630 of FIG. 6) and may maintain a DP AUX switch (e.g., the AUX switch 640 of FIG. 6) and a broadcast switch (e.g., the broadcast selection switch 625 of FIG. 6) to be turned off in operation 1211. In the idle state, the electronic device may determine whether water infiltrates into the Type-C connector. When the connector is connected to the connector, the electronic device may recognize the connection of the connector in operation 1213 and may recognize the connected external device, based on the CCIC in operation 1215. For example, in operation 1215, the electronic device may analyze the PID of the connected external device, thereby recognizing the external device. When the connected external device corresponds to a DP PID, the electronic device may recognize the connection of a DP in operation 1217, may turn on the DP AUX switch, and may turn off the CCIC and the broadcast switch in operation 1219. The electronic device may process a DP signal received through SBU1 and SBU2 pins of the connector.

When an external antenna device with a Type-C connector is connected, the electronic device may recognize the connection of the external antenna device in operation 1221. When the connection of the external antenna device including the Type-C connector is recognized, the electronic device may analyze an application being executed in operation 1223. When the application being executed is a broadcast application, the electronic device may turn on the broadcast switch, may turn off the CCIC and the DP AUX switch, and may reproduce a broadcast signal in operation 1227. The broadcast signal may be an FM signal or a DMB signal. When the application being executed corresponds to multimedia playback, such as music or video playback, the electronic device may recognize multimedia playback in operation 1234 and may perform a multimedia playback service in operation 1229.

In one embodiment, an antenna of the external antenna device having the Type-C connector may be connected to an SBU pin, a first ground pin (e.g., GND A1 and GND B1), or a second ground pin (e.g., GND A12 and GND B12) of the connector, and first and second ground pins of the connector of the electronic device may be connected to the ground. When the antenna is connected to SBU1 and SUB2 pins, a broadcast signal may be received through the antenna including an SBU line (or a first ground line and the SBU line or a second ground line and the SBU line) and may be applied to an SBU line of the electronic device.

In one embodiment, the antenna of the external antenna device having the Type-C connector may be connected to the first ground pin (e.g., GND A1 and GND B1) and/or the second ground pin (e.g., GND A12 and GND B12) of the connector, and the first ground pin and/or the second ground pin of the connector of the electronic device may be connected to the ground through a bead. When the antenna is connected to the ground pins, a broadcast signal may be received through the antenna including the ground line (the first ground line and/or the second ground line) and may be applied to the SBU line of the electronic device.

When the external device connected to the Type-C connector of the electronic device is not a DP device or an external antenna device, the electronic device may recognize that a different external device is connected in operations 1217 and 1221 and may execute a service for the recognized external device in operation 1251.

A broadcast signal reception method of an electronic device according to various embodiments may include: identifying, through a first pin, a type of an external electronic device connected through a connector including the first pin and a second pin; driving a broadcast reception module with an external antenna included in the external electronic device and the broadcast reception module electrically connected through the first pin when the type of the external electronic device corresponds to a specified electronic device type; receiving a broadcast signal using the broadcast reception module from the external antenna; and outputting an audio signal generated based at least partly on the broadcast signal to a specified device through the second pin.

The connector may be a Type-C socket connector. The receiving of the broadcast signal may include receiving the broadcast signal through a sideband use (SBU) pin as the first pin, and the outputting of the audio signal to the specified device may include outputting the audio signal through D+ and D− pins as the second pin.

The broadcast reception module may be an FM broadcast reception module.

The driving of the broadcast reception module may include connecting an output from the SBU pin of the socket connector to an FM reception module when the selected broadcast reception module is the FM reception module; and connecting the output from the SBU pin of the socket connector to a DMB reception module when the selected broadcast reception module is the DMB reception module.

Figure 13A:
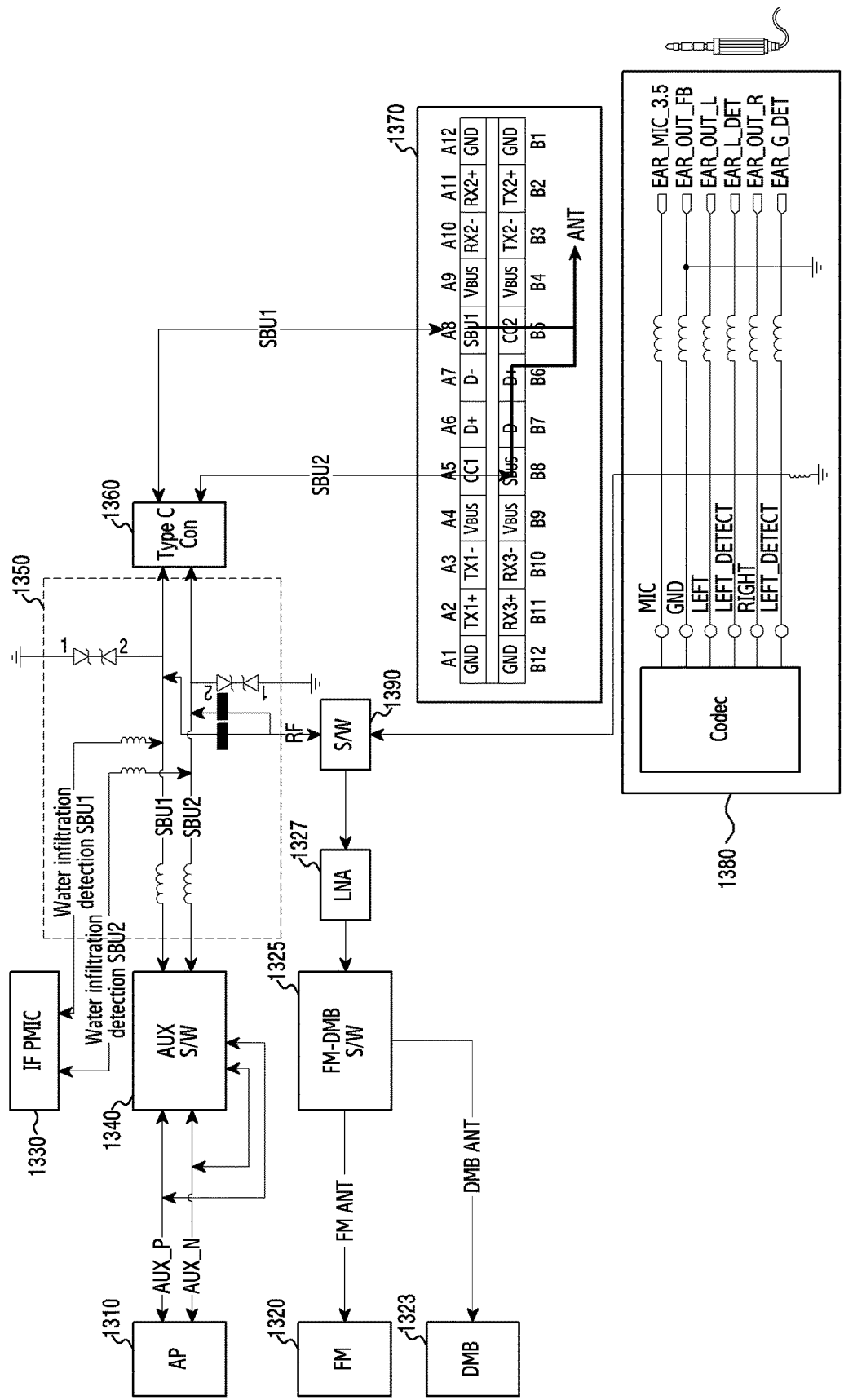
FIG. 13A and FIG. 13B illustrate an example of configuring a broadcast antenna through an electronic device and a plurality of earphone antenna devices according to various embodiments.
Figure 13B:
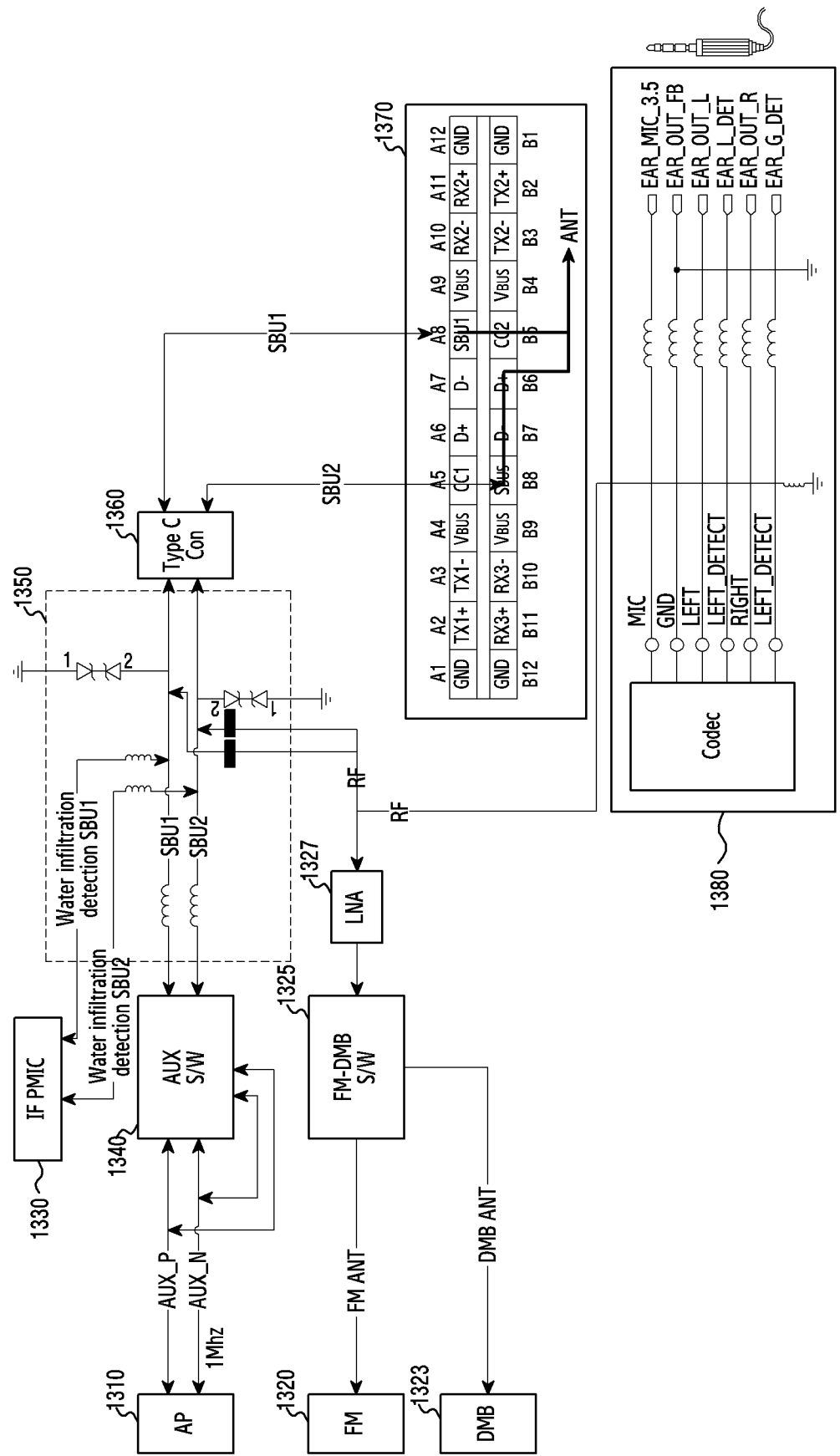

FIG. 13A and FIG. 13B illustrate an example of configuring a broadcast antenna through an electronic device and a plurality of external antenna devices according to various embodiments.

Referring to FIG. 13A and FIG. 13B, the electronic device (e.g., the electronic device 101 of FIG. 1, the electronic device 201 of FIG. 2, or FIG. 3) may include a processor 1310, a codec 1315, an FM reception module 1320, a DMB reception module 1323, an IF PMIC 1330, an AUX switch 1340, a broadcast selection switch 1325, a low-noise amplifier (LNA) 1327, a signal blocking circuit 1350, a connector 1360, an antenna switch 1390, and a jack not shown. A connector 1370 may be a connector of a first external antenna device using a Type-C connector, and a jack 1380 may be a jack of a second external antenna device using a 3.5 phi connector.

In FIG. 13A, the electronic device may include the jack (not shown) to connect the Type-C connector 1360 and a 3.5 phi jack. The antenna switch 1390 may be connected to the connector 1360 and the jack. When the connector of the first external antenna device and the jack of the second external antenna device are connected respectively to the connector 1360 and the jack not shown of the electronic device, the processor 1310 may control the antenna switch 1390 to apply a broadcast signal, received through the connector 1360 or the jack, to the LNA 1327. The processor 1310 may control switching connection of the antenna switch 1390, based on a set priority. For example, when the Type-C connector and the 3.5 phi connector are connected at the same time, the processor 1310 may select the external antenna device in a Type-C connector mode.

In FIG. 13B, the electronic device may include the jack (not shown) to connect the Type-C connector 1360 and a 3.5 phi jack. In the electronic device, an output terminal of the Type-C connector 1360 and an output terminal of the 3.5 phi jack may be composed at an input terminal of the LNA 1327. When the connector of the first external antenna device and the jack of the second external antenna device are connected respectively to the connector 1360 and the jack not shown of the electronic device, broadcast signals output from the two antenna devices may be synthesized and input to the LNA 1327. Therefore, the Type-C connector and the 3.5 phi connector may be bridged to use both a Type-C connector line and a 3.5 phi connector line as antenna lines.

FIG. 13A and FIG. 13B illustrate an example in which an electronic device and a Type-C external device use an SBU line as an antenna. In a Type-C connector having a first ground pin and a second ground pin, one of two ground lines may be connected to the ground through a bead and the other ground line may be directly connected to the ground line, thereby using the ground lines of the Type-C connector as an antenna.

Figure 14:
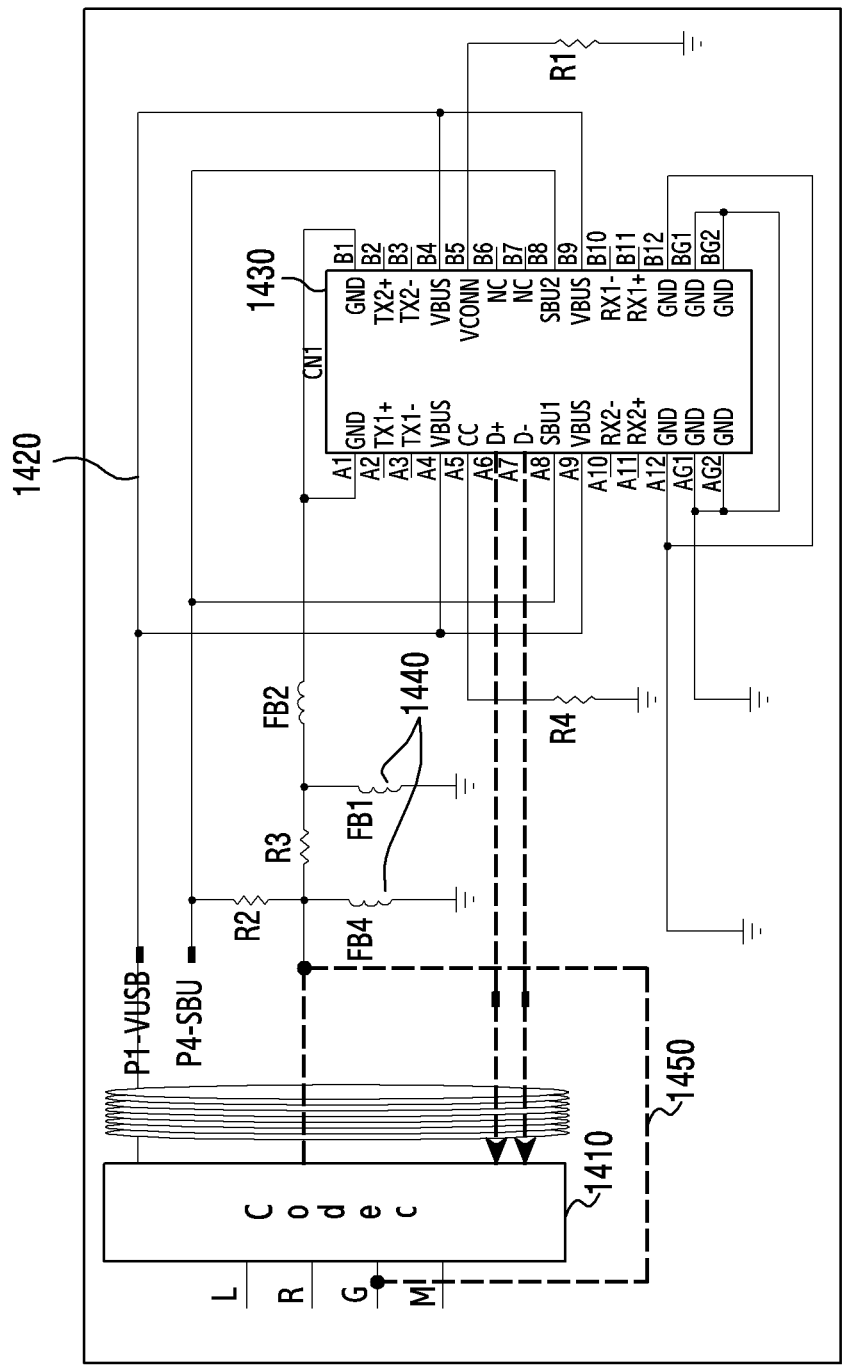
FIG. 14 illustrates an example of configuring a broadcast antenna using a 3.5 phi adaptor according to various embodiments.

FIG. 14 illustrates an example of configuring a broadcast antenna using a 3.5 phi adaptor according to various embodiments.

Referring to FIG. 14, a 3.5 phi external antenna device may include a codec 1410, and an adaptor may include an antenna 1420 and a connector 1430. A 3.5 phi ground line may be connected to a first ground line or a second ground line of the Type-C connector 1430. For example, a first ground pin (GND A1 and GND B1 pins) may be connected to the ground through a bead 1440, and a second ground pin (GND A12 and GND B12 pins) may be directly connected to the ground. The 3.5 phi ground line (G) may be connected, through a line 1450, to the first ground line connected to the first ground pin (GND A1 and GND B1 pins). An electronic device and the 3.5 phi external antenna device configured as illustrated in FIG. 14 may receive a broadcast signal (e.g., an FM signal) through the first ground line of a Type-C adaptor.

FIG. 14 shows an example of configuring the first ground line of the adaptor as an antenna. Also, the first ground pin (GND A1 and GND B1 pins) may be directly connected to the ground, the second ground pin (GND A12 and GND B12 pins) may be connected to the ground through the bead, and the 3.5 phi ground line may be connected to the second ground pin (GND A12 and GND B12 pins). The electronic device and the 3.5 phi external antenna device may receive a broadcast signal (e.g., an FM signal) through the second ground line of a Type-C adaptor.

Although various embodiments have been illustrated, different modifications may be possible without departing from the scope of the various embodiments of the disclosure. Therefore, the scope of the various embodiments will be defined not by the described embodiments but by the appended claims and equivalents thereto.

The invention claimed is:
1. An electronic device comprising:
   a broadcast reception module;
   a connector configured to comprise a first pin and a second pin, wherein the connector is a Type-C connector and the first pin is a sideband use (SBU) pin;

a connection detection module configured to be connected to the SBU pin of the connector and to be turned off when an external electronic device is connected to the connector; and a processor, wherein the processor is configured to:

detect connection of the external electronic device, based on turnoff of the connection detection module;

identify, through the first pin, a type of theme external electronic device connected through the connector;

drive the broadcast reception module with an external antenna comprised in the external electronic device and the broadcast reception module electrically connected through the first pin when the type of the external electronic device corresponds to a specified electronic device type;

receive a broadcast signal using the broadcast reception module from the external antenna; and output an audio signal generated based at least partly on the broadcast signal to a specified device through the second pin.

2. The electronic device as claimed in claim 1, wherein the second pin comprises D+ and D− pins.

3. The electronic device as claimed in claim 2, wherein the broadcast reception module is a frequency modulation (FM) broadcast reception module.

4. The electronic device as claimed in claim 2, further comprising:

a switch configured to be connected to the SBU pin of the connector and the processor and to perform switching when a pin of a display port (DP) connector is inserted in a reverse direction.

5. The electronic device as claimed in claim 2, wherein the broadcast reception module comprises:

a broadcast selection switch configured to be connected to the SBU pin of the connector;

a frequency modulation (FM) broadcast reception module configured to be connected to the broadcast selection switch; and a digital multimedia broadcasting (DMB) broadcast reception module configured to be connected to the broadcast selection switch, and the processor connects an output from the broadcast selection switch to a corresponding broadcast reception module, based on a broadcast application being executed when connection of the external antenna to the connector is detected.

6. A broadcast signal reception method of an electronic device, the method comprising:

detecting connection of an external electronic device, based on turnoff of a connection detection module of the electronic device, identifying, through a first pin, a type of the external electronic device connected through a connector comprising the first pin and a second pin;

driving a broadcast reception module with an external antenna comprised in the external electronic device and the broadcast reception module electrically connected through the first pin when the type of the external electronic device corresponds to a specified electronic device type;

receiving a broadcast signal using the broadcast reception module from the external antenna; and outputting an audio signal generated based at least partly on the broadcast signal to a specified device through the second pin, wherein the connector is a Type-C connector and the first pin is a sideband use (SBU) pin, and wherein the connection detection module is configured to be connected to the SBU pin of the connector and to be turn off when the external electronic device is connected to the connector.

7. The method as claimed in claim 6, wherein the receiving of the broadcast signal comprises receiving the broadcast signal through the first pin, and wherein the outputting of the audio signal to the specified device comprises outputting the audio signal through D+ and D− pins as the second pin.

8. The method as claimed in claim 7, wherein the broadcast reception module is a frequency modulation (FM) broadcast reception module.

9. The method as claimed in claim 7, wherein the driving of the broadcast reception module comprises connecting an output from the SBU pin of the connector to a frequency modulation (FM) reception module when the selected broadcast reception module is the FM reception module; and connecting the output from the SBU pin of the connector to a digital multimedia broadcasting (DMB) reception module when the selected broadcast reception module is the DMB reception module.

* * * * *